(12) United States Patent
Fukuhara et al.

(10) Patent No.: US 8,467,442 B2
(45) Date of Patent: Jun. 18, 2013

(54) IMAGE SEARCHING DEVICE AND METHOD, PROGRAM AND PROGRAM RECORDING MEDIUM

(75) Inventors: Takahiro Fukuhara, Kanagawa (JP); Hitoshi Kiya, Tokyo (JP)

(73) Assignees: Sony Corporationn, Tokyo (JP); Hitoshi Kiya, Tokyo (JP)

( * ) Notice: Subject to any disclaimer, the term of this patent is extended or adjusted under 35 U.S.C. 154(b) by 0 days.

(21) Appl. No.: 13/081,552

(22) Filed: Apr. 7, 2011

(65) Prior Publication Data

US 2011/0182525 A1 Jul. 28, 2011

Related U.S. Application Data

(62) Division of application No. 11/335,307, filed on Jan. 19, 2006, now Pat. No. 7,949,042.

(30) Foreign Application Priority Data

Jan. 21, 2005 (JP) .................................. 2005-014750

(51) Int. Cl.
*H04N 7/12* (2006.01)

(52) U.S. Cl.
USPC ........... 375/240; 382/276; 382/232; 382/118; 382/119; 382/113; 704/500; 713/176

(58) Field of Classification Search
USPC ................ 375/240.12, 240.01, 240; 382/276, 382/232, 118, 119, 113; 704/500; 713/176
See application file for complete search history.

(56) References Cited

U.S. PATENT DOCUMENTS

| 6,532,541 B1 | 3/2003 | Chang et al. |
| 6,618,507 B1 * | 9/2003 | Divakaran et al. ............ 382/236 |
| 2002/0019819 A1 * | 2/2002 | Sekiguchi et al. ................ 707/3 |

FOREIGN PATENT DOCUMENTS

| JP | 1 114282 | 5/1989 |
| JP | 8 83348 | 3/1996 |
| JP | 8 161497 | 6/1996 |
| JP | 2003 323602 | 11/2003 |
| JP | 2004 45565 | 2/2004 |
| JP | 2004 328577 | 11/2004 |

OTHER PUBLICATIONS

Takeru Youta et al., "Similarity-Based Image Retrieval Based on the Mean Square Error of DCT Coefficients", Institute of Electronics, Information and Communication Engineers technical study reports, Japan, Corporate judicial person Institute of Electronics, Information and Communication Engineers, Mar. 7, 2003, vol. 102, No. 713, p. 37-42.

* cited by examiner

*Primary Examiner* — Zewdu Kassa
(74) *Attorney, Agent, or Firm* — Frommer Lawrence & Haug LLP; William S. Frommer

(57) ABSTRACT

An encoded code stream is searched for a frame generally coincident with a specific frame without having to decoding the frame to its original image. The present invention provides an image search device that searches an object encoded code stream formed by compression coding of a plurality of frames for a frame generally coincident with a specific one, which includes a decoder for making entropy decoding of the object encoded code stream to generate quantization coefficients of each frame, a matching unit for making matching between the quantization coefficients of the specific frame and those of each frame which are generated by the decoder and correspond in sample position to those of the specific frame, and a judging unit for judging, based on the result of matching, whether the frame is generally coincident with the specific one.

16 Claims, 27 Drawing Sheets

| · No. of all frames : 300 | |
| · No. of code blocks : 168 | |
| Order of code block in which disagreement in sign has first been found | No. of frames |
|---|---|
| First | 292 frames |
| Fourth | 3 frames |
| Ninth | 5 frames |

FIG.20

IMAGE SEARCHING DEVICE AND METHOD, PROGRAM AND PROGRAM RECORDING MEDIUM

CROSS REFERENCES TO RELATED APPLICATIONS

This is a division of application Ser. No. 11/335,307, filed Jan. 19, 2006, now U.S. Pat. No. 7,949,042 which is entitled to the priority filing date of Japanese application 2005-014750 filed on Jan. 21, 2005, the entirety of which is incorporated herein by reference.

BACKGROUND OF THE INVENTION

1. Field of the Invention

The present invention relates to an image search device and method, for searching an encoded code stream formed by compression coding of a plurality of frames for a frame generally coincident with a specific one, and a program and a program recording medium.

2. Description of the Related Art

For searching an video content or managing a network content, for example, there has been required in the past a technique for searching an unknown video content for a frame generally coincident with a specific one with the image of the specific frame being taken as a search query. For example, the Japanese Patent Application Laid Open No. 2004-45565 proposes a technique for searching a video content for a frame generally coincident with a specific frame by extracting a feature value from the video content at each of short-time frames to determine a feature vector and making a comparison between this feature vector and the feature vector of a reference image.

SUMMARY OF THE INVENTION

These days, the imaging devices such as a digital camera and camcorder have been increasingly prevailing and the image digitization technique has correspondingly shown a rapid innovation. Even a long-time video content such as a movie, TV program or the like can easily be recorded to a hard disk or the like via compression coding thereof with an image compression technique as defined in JPEG (Joint Photographic Experts Group), MPEG (Moving Picture Experts Group) or JPEG 2000.

Therefore, it is expected that searching a compression-coded video for a frame generally coincident with a specific one will be needed more and more. In case the conventional technique as disclosed in the above Japanese Patent Application Laid Open No. 2004-45565 and the like is employed, however, since it is necessary to decode an encoded code stream before searching, so the amount of calculation for the entire searching procedure will be larger.

It is therefore desirable to overcome the above-mentioned drawbacks of the related art by providing an image searching device and method, capable of searching an encoded code stream for a frame generally coincident with a specific one without having to decode the encoded code stream to its original form, a program, and a program recording medium.

According to the present invention, there is provided an image search device that searches an object encoded code stream formed by compression coding of a plurality of frames for a frame generally coincident with a specific one, the device including:

a decoding means for making entropy decoding of the object encoded code stream to generate quantization coefficients of each frame;

a matching means for making matching between the quantization coefficients of the specific frame and those of each frame which are generated by the decoding means and correspond in sample position to those of the specific frame; and a judging means for judging, based on the result of matching, whether the frame is generally coincident with the specific one.

The matching means in the above image search device makes sequential matching in sign (positive or positive) between the quantization coefficients corresponding in sample position to each other.

The above image search device according to the present invention further includes a dequantizing means for dequantizing the quantization coefficients of each frame, generated by the decoding means, to provide transform coefficients of each frame. In this case, the matching means makes matching in sign between (positive or negative) between the transform coefficients of the specific frame and those of each frame which are generated by the dequantizing means and correspond in sample position to those of the specific frame.

Also, the judging means in the above image search device increases the count of a counter each time there arises a frame whose quantization coefficients do not match in sign with those of the specific frame, and decides that the frame is generally coincident with the specific one in case the count when the matching of all the quantization coefficients of the frame with those of the specific frame is over is smaller than a predetermined threshold.

According to the present invention, there is also provided an image searching method of searching an object encoded code stream formed by compression coding of a plurality of frames for a frame generally coincident with a specific one, the method including the steps of:

making entropy decoding of the object encoded code stream to generate quantization coefficients of each frame;

making matching between the quantization coefficients of the specific frame and those of each frame which are generated in the decoding step and correspond in sample position to those of the specific frame; and judging, based on the result of matching, whether the frame is generally coincident with the specific one.

According to the present invention, there is also provided an image search device that searches an object encoded code stream formed by compression coding of a plurality of frames for a frame generally coincident with a specific one, the device including:

a quantization or transform coefficient acquiring means for acquiring quantization or transform coefficients of each frame, calculated when generating the object encoded code stream, and quantization or transform coefficients of the specific frame;

a matching means for making matching between the quantization or transform coefficients of the specific frame and those of each frame which are generated by the quantization or transform coefficient acquiring means and correspond in sample position to those of the specific frame; and a judging means for judging, based on the result of matching, whether each frame is generally coincident with the specific one.

According to the present invention, there is also provided an image searching method of searching an object encoded code stream formed by compression coding of a plurality of frames for a frame generally coincident with a specific one, the method including the steps of:

acquiring quantization or transform coefficients of each frame, calculated when generating the object encoded code stream, and quantization or transform coefficients of the specific frame;

making matching between the quantization or transform coefficients of the specific frame and those of each frame which are generated in the quantization or transform coefficient acquiring step and correspond in sample position to those of the specific frame; and judging, based on the result of matching, whether each frame is generally coincident with the specific one.

According to the present invention, there is also provided an image search device that searches an object encoded code stream formed by compression coding of a plurality of frames for a frame generally coincident with a specific one, the device including:

a first recording means for recording quantization or transform coefficients of the specific frame, calculated when encoding the specific frame, along with the specific frame to a recording medium;

a second recording means for recording quantization or transform coefficients of each frame, calculated when searching the object encoded code stream, along with the object encoded code stream to the recording medium;

a quantization or transform coefficient acquiring means for acquiring the quantization or transform coefficients of each frame and those of the specific frame from the recording medium;

a matching means for making matching between the quantization or transform coefficients of the specific frame and those of each fame which are generated by the quantization or transform coefficient acquiring means and correspond in sample position to those of the specific frame;

a judging means for judging, based on the result of matching, whether each frame is generally coincident with the specific one;

a decoding means for decoding the frame decided by the judging means to be generally coincident with the specific frame; and an output means for outputting the frame decoded by the decoding means to a displaying means.

According to the present invention, there is also provided an image searching method of searching an object encoded code stream formed by compression coding of a plurality of frames for a frame generally coincident with a specific one, the method including:

a first recording step of recording quantization or transform coefficients of the specific frame, calculated when encoding the specific frame, along with the specific frame to a recording medium;

a second recording step of recording quantization or transform coefficients of each frame, calculated when searching the object encoded code stream, along with the object encoded code stream to the recording medium;

a quantization or transform coefficient acquiring step of acquiring the quantization or transform coefficients of each frame and those of the specific frame from the recording medium;

a matching step of making matching between the quantization or transform coefficients of the specific frame and those of each frame which are generated in the quantization or transform coefficient acquiring step and correspond in sample position to those of the specific frame;

a judging step of judging, based on the result of matching, whether each frame is generally coincident with the specific one;

a decoding step of decoding the frame decided in the judging step to be generally coincident with the specific frame; and an output step of outputting the frame decoded in the decoding step to a displaying means.

According to the present invention, there are also provided a program for allowing a computer to carry out the above-mentioned image searching operations, and a recording medium having the program recorded therein and which is readable by a computer.

With the image searching device and method, program and program recording medium according to the present invention, the amount of calculation required for the entire image searching procedure can considerably be reduced as compared with that required for the conventional image search by decoding the encoded code stream to its original form because an object encoded code stream formed by compression coding of a plurality of frames is searched for a frame generally coincident with a specific one by making matching in sign (positive or negative) between the quantization or transform coefficients of the specific frame and those of each frame which correspond in sample position to those of the specific frame, and judging, based on the result of matching, whether each frame is generally coincident with the specific one. Especially, since the matching between the quantization or transform coefficients is made only in sign (positive or negative) without their absolute values being taken in account, so the searching can be done independently of the ratio at which the object encoded code stream has been compressed.

BRIEF DESCRIPTION OF THE DRAWINGS

FIG. 20 shows the result of identification of a first code block in an encoded code stream actually formed by the compression coding conforming to JPEG 2000, in which disagreement was found between the coefficients of a frame and those of a specific one;

DETAILED DESCRIPTION OF THE PREFERRED EMBODIMENTS

The present invention will be described in detail below concerning the embodiments thereof with reference to the accompanying drawings.

First Preferred Embodiment

Figure 1:
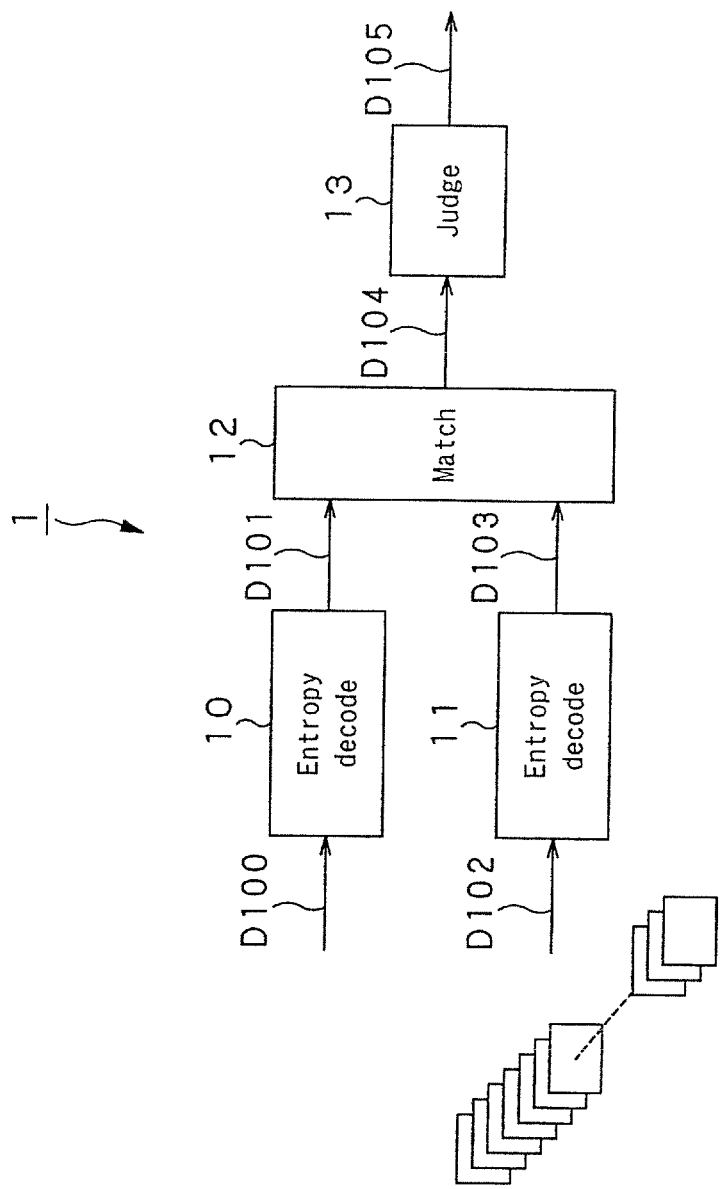
FIG. 1 is schematic block diagram of an image search device as a first embodiment of the present invention.

Referring now to FIG. 1, an image search device as the first embodiment of the present invention is schematically illustrated in the form of a block diagram. As shown in FIG. 1, the image search device as the first embodiment, generally indicated with a reference numeral 1, includes entropy decoders 10 and 11, matching unit 12, and a judging unit 13.

In the image search device 1, the entropy decoder 10 makes entropy decoding of an encoded code stream D100 of a specific frame as a search query according to a predetermined algorithm, and supplies quantization coefficients D101 of the specific frame to the matching unit 12. On the other hand, the entropy decoder 11 makes entropy decoding of an encoded code stream D102 of an object frame of an encoded code stream (set of encoded code streams of each frame) formed by compression coding of a plurality of frame images according to a predetermined algorithm, and supplies quantization coefficients D103 of the object frame to the matching unit 12. It should be noted that in case the quantization coefficients D101 of the specific frame are already available, the operation of the entropy decoder 10 may be omitted.

Figure 2:
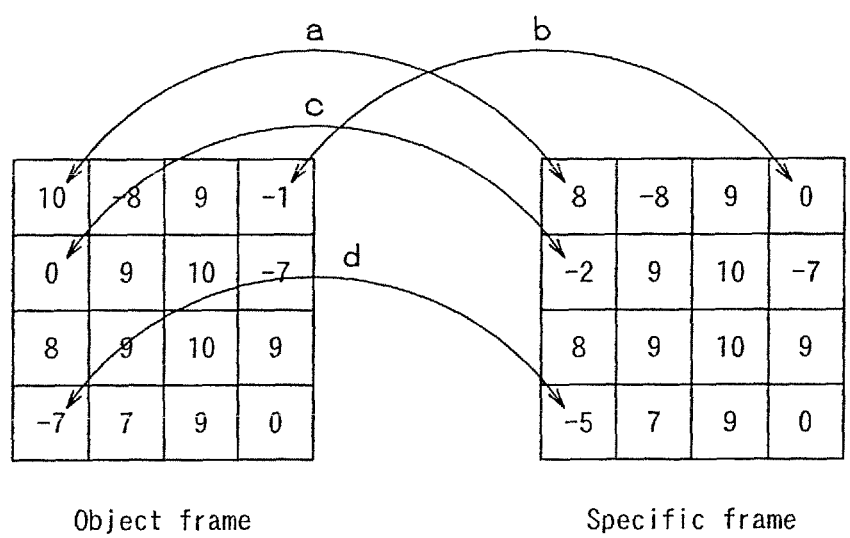
FIG. 2 shows an example of matching effected in a matching unit.

The matching unit 12 makes matching in sign (positive or negative) between the quantization coefficients D101 of the specific frame and quantization coefficients D103 of an object frame which takes the same sample position as that of the specific frame, and supplies the result of matching D104 to the judging unit 13. FIG. 2 shows an example of matching between frames each including a total of 16 samples (4 samples in each of row and column). In FIG. 2, arrows a and d indicate samples different in absolute value from each other but coincident in sign (positive or negative) with each other.

The judging unit 13 judges, based on the result of matching D104 supplied from the matching unit 12, whether the object and specific frames are generally coincident with each other. More specifically, each time samples not coincident in sign (positive or negative) with each other appear, the count of a counter is increased by one. In case the count is zero (0) when matching has been completed of all the samples, that is, in case the quantization coefficients of all the samples are found coincident in sign (positive or negative) with each other, it is decided that the object and specific frames are generally coincident with each other, and the result of judgment D105 is supplied to outside.

Figure 3:
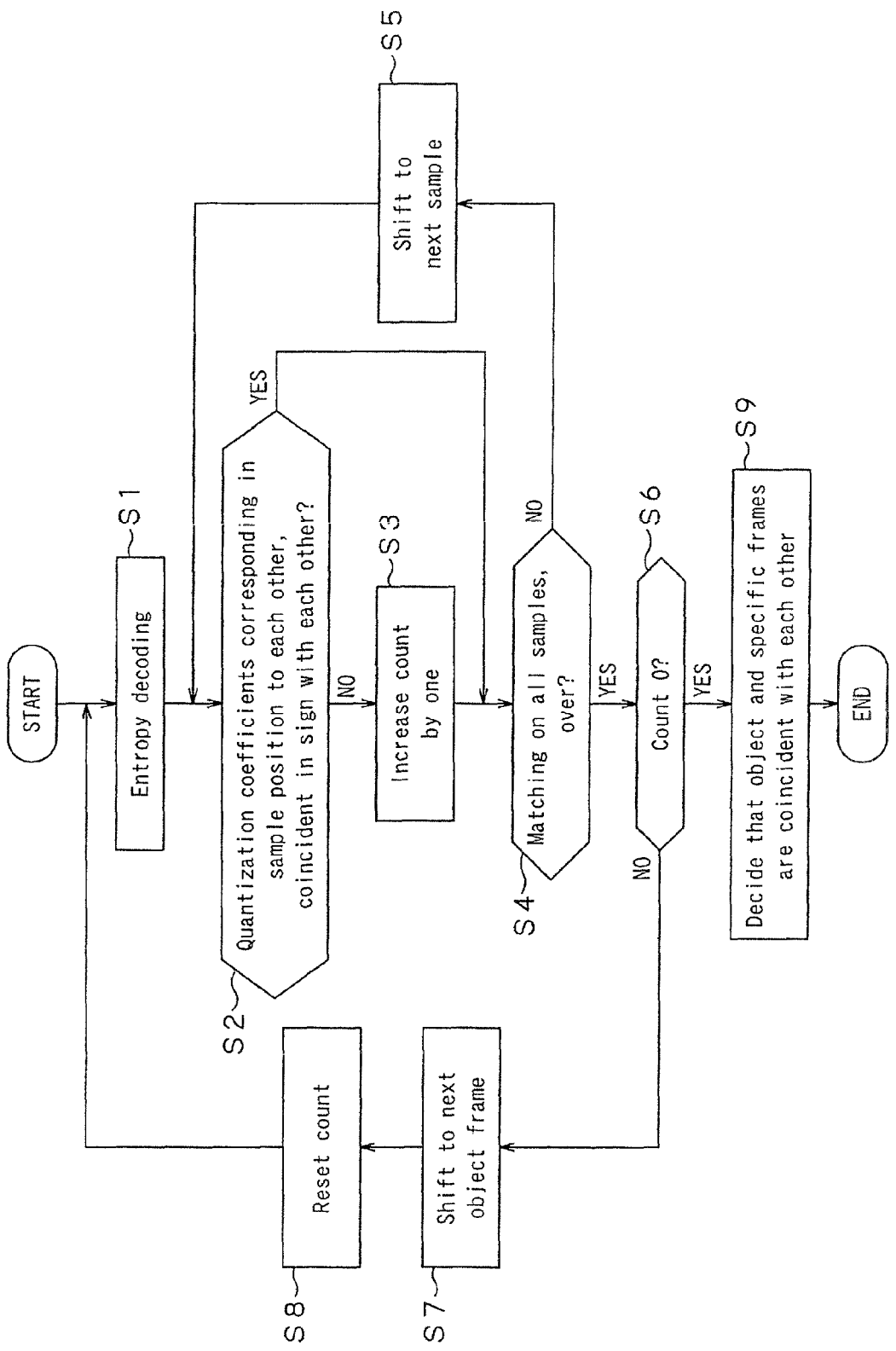
FIG. 3 shows a flow of operations made by the image search device in FIG. 1.

FIG. 3 shows a flow of operations of the image search device 1. First in step S1, the image search device 1 makes entropy decoding of an encoded code stream D100 of a specific frame and an encoded code stream D102 of an object frame to provide quantization coefficients D101 of the specific frame and quantization coefficients D103 of the object frame.

Next in step S2, the image search device 1 makes matching in sign (positive or negative) between ones, corresponding in sample position to each other, of the quantization coefficients D101 of the specific frame and those D103 of the object frame to judge whether the signs of the quantization coefficients D101 and D103 are coincident with each other. In case the signs are coincident with each other, the image search device 1 goes to step S4. If the signs are not coincident with each other, the image search device 1 will increase the count of a counter by one in step S3 and then goes to step S4. It should be noted that in case any one of the quantization coefficients is zero (0) as indicated with b and c in FIG. 2, for example, the image search device 1 should desirably skip over the matching.

Next in step S4, the image search device 1 judges whether the matching is over on all the samples. If the matching is decided not to be yet over so, the image search device 1 will shift to a next sample in step S5 and then return to step S2. On the contrary, if the matching is decided to be over so, the image search device 1 goes to step S6.

In step S6, the image search device 1 judges whether the count is 0 or not. If the count is not 0, the image search device 1 will decide that the object frame is not coincident with the specific one and go to step S7 where it will be supplied with an encoded code stream of a next object frame. Then, it goes to step S8 where it will reset the count to 0 and repeat the above procedure starting at step S1. On the contrary, in case the count is 0, the object frame is coincident with the specific one with respect all the samples. So, the image search device 1 goes to step S9 where it will decide that the object frame is generally coincident with the specific one and exit the searching operation.

Note that although it was described above with reference to the flow diagram in FIG. 3 that matching is made on all the samples in each of the frames, it is not any problem to decide that an object frame is coincident with a specific one when the count is larger than the predetermined threshold and shift to a next object frame, which is intended to reduce the time required for the searching procedure. Especially, in case it is decided that the object frame is generally coincident with the specific frame only when the count at the time the matching is over on all the samples is 0, shifting to a next object frame when the count becomes one (1) will make it possible to reduce the time required for the searching procedure.

Also, it has been described above that it is decided that the object frame is generally coincident with the specific one only when the count at the time the matching is over on all the samples is 0. However, the image search device may be adapted to decide that the object frame is generally coincident with the specific one when the count is smaller than the predetermined threshold at the time the matching is over on all the samples. In this case, there is a possibility that a plurality of candidate frames will appear, but it is possible to prevent any failure in search.

Since the image search device 1 makes a search for a frame image which is generally coincident with a specific-frame image by making matching between quantization coefficients of the frames, corresponding in sample position to each other as above, the amount of calculation for the entire searching procedure can considerably be reduced in comparison with the conventional frame search which is made after decoding the frame to an original frame image. Especially, since the matching between the quantization coefficients is made only in sign (positive or negative) without their absolute values being taken in account, so the searching can be done even in case the encoded code stream D100 of the specific frame is different in ratio of compression from the encoded code stream D102 of the object frame.

Second Embodiment

Figure 4:
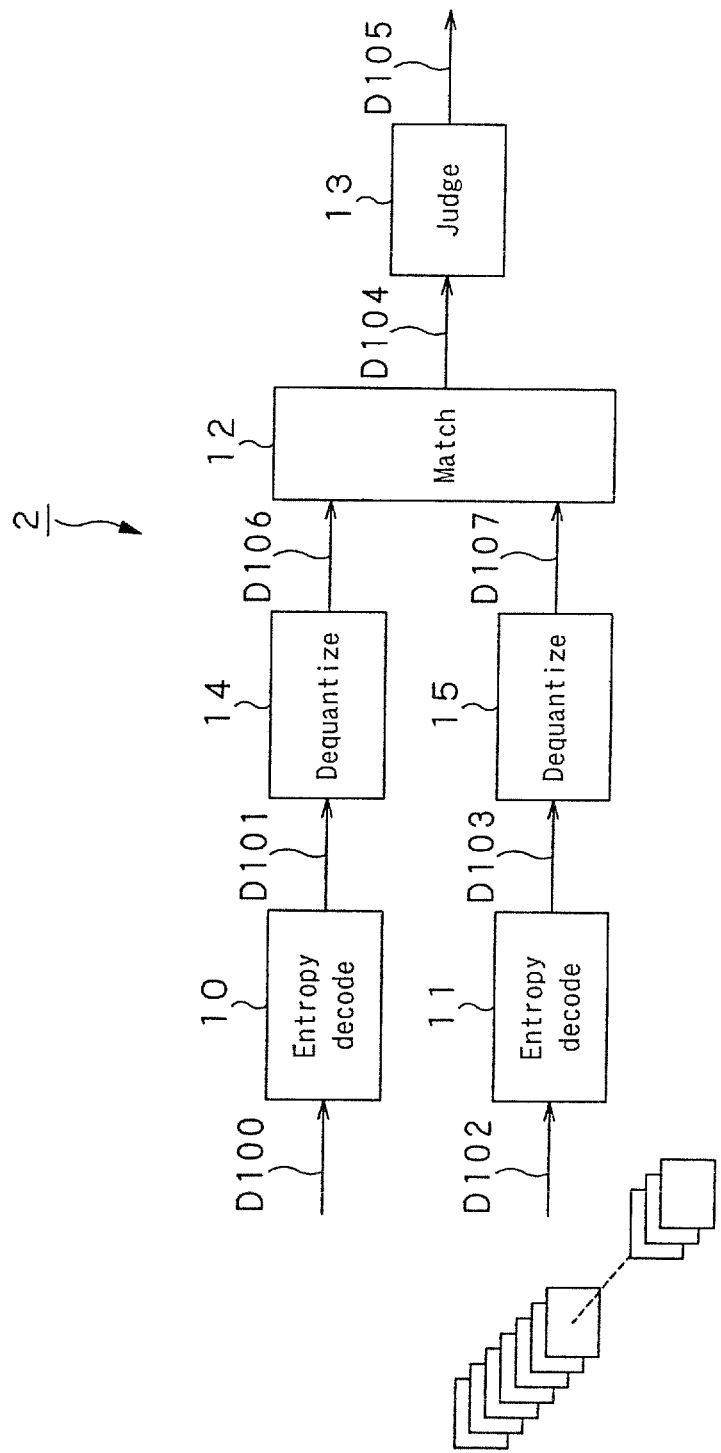
FIG. 4 is a schematic block diagram of an image search device as a second embodiment of the present invention.

FIG. 4 shows an image search device, generally indicated with a reference numeral 2, as a second embodiment of the present invention. The image search device 2 is similar in basic structure to the image search device 1 shown in FIG. 1 except for it further includes dequantizers 14 and 15 for making matching in sign (positive or negative) between transform coefficients of a frame and specific frame, corresponding in sample position to each other. Therefore, the same elements of the image search device 2 as those of the image search device 1 in FIG. 1 will be indicated with the same reference numerals and will not be explained in detail.

In the image search device 2, the dequantizer 14 dequantizes quantization coefficients D101 of a specific frame to provide transform coefficients D106 of the specific frame, and supplies the convention coefficients D106 to a matching unit 12. On the other hand, the dequantizer 15 dequantizes quantization coefficients D103 of an object frame to provide transform coefficients D107 of the object frame thus obtained to the matching unit 12. The matching unit 12 makes matching in sign (positive or negative) between ones, corresponding in sample position to each other, of the transform coefficients D106 of the specific frame and those D107 of the object frame, and supplies the result of matching D104 to a judging unit 13. It should be noted that the matching technique adopted in this second embodiment is similar to that employed in the first embodiment. The judging unit 13 judges, based on the result of matching D104 supplied from the matching unit 12, whether the object frame is generally coincident with the specific one.

Since the image search device 2 makes a search for a frame image which is generally coincident with a specific-frame image by making matching between transform coefficients of the frames, corresponding in sample position to each other as above, the amount of calculation for the entire searching procedure can considerably be reduced in comparison with the conventional frame search which is made after decoding the frame to an original frame image. Especially, since the matching between the quantization coefficients is made only in sign (positive or negative) without their absolute values being taken in account, so the searching can be done even in case the encoded code stream D100 of the specific frame is different in ratio of compression from the encoded code stream D102 of the object frame.

Note that the amount of calculation required for the entire searching procedure in the second embodiment is longer than in the first embodiment because the dequantizers 14 and 15 are required but the second embodiment is more useful in case the transform coefficient D106 of the specific frame is already available.

Third Embodiment

Figure 5:
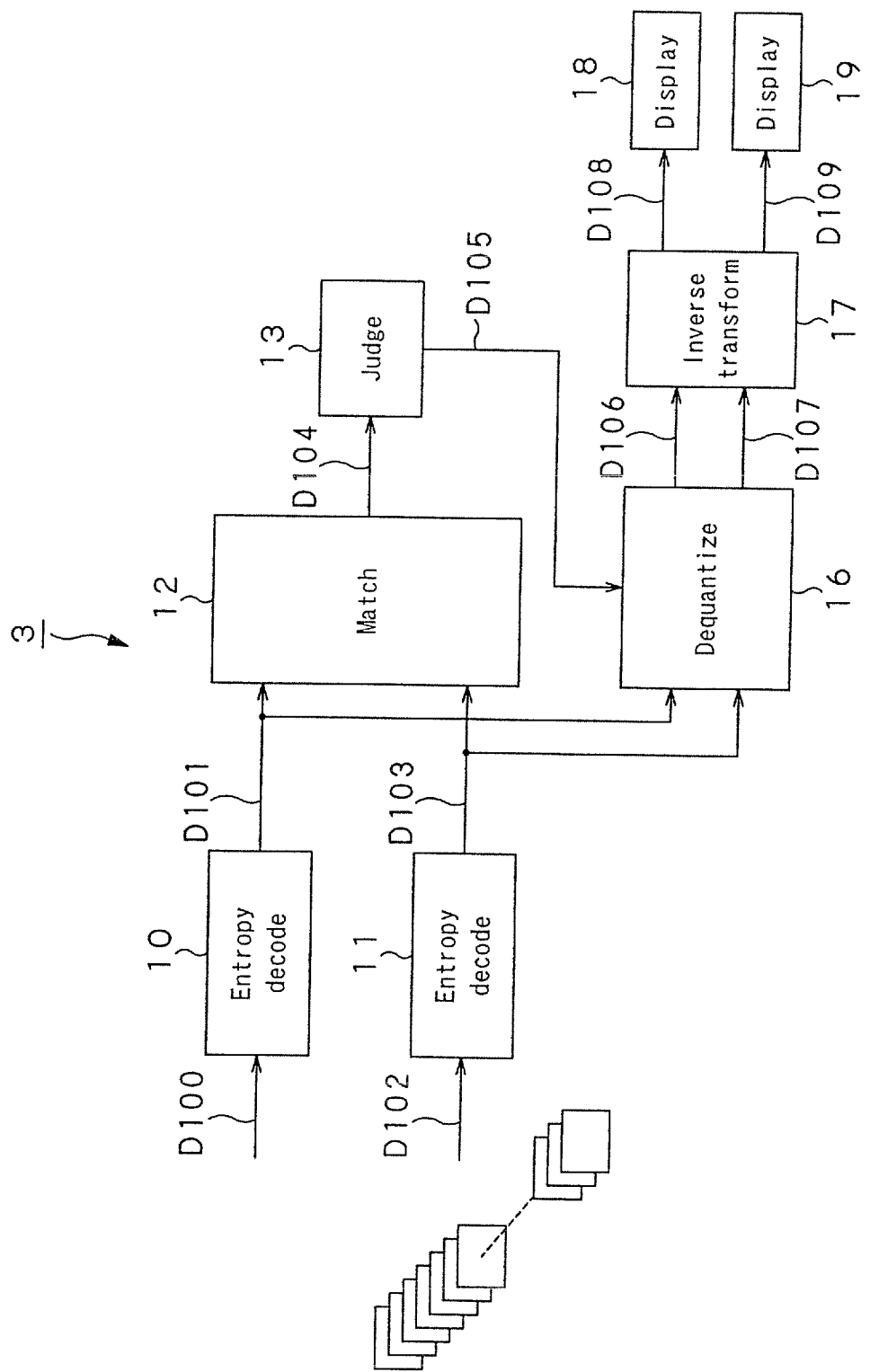
FIG. 5 is a schematic block diagram of an image search device as a third embodiment of the present invention, in which matching is made between the quantization coefficients of a frame and those of a specific frame.
Figure 6:
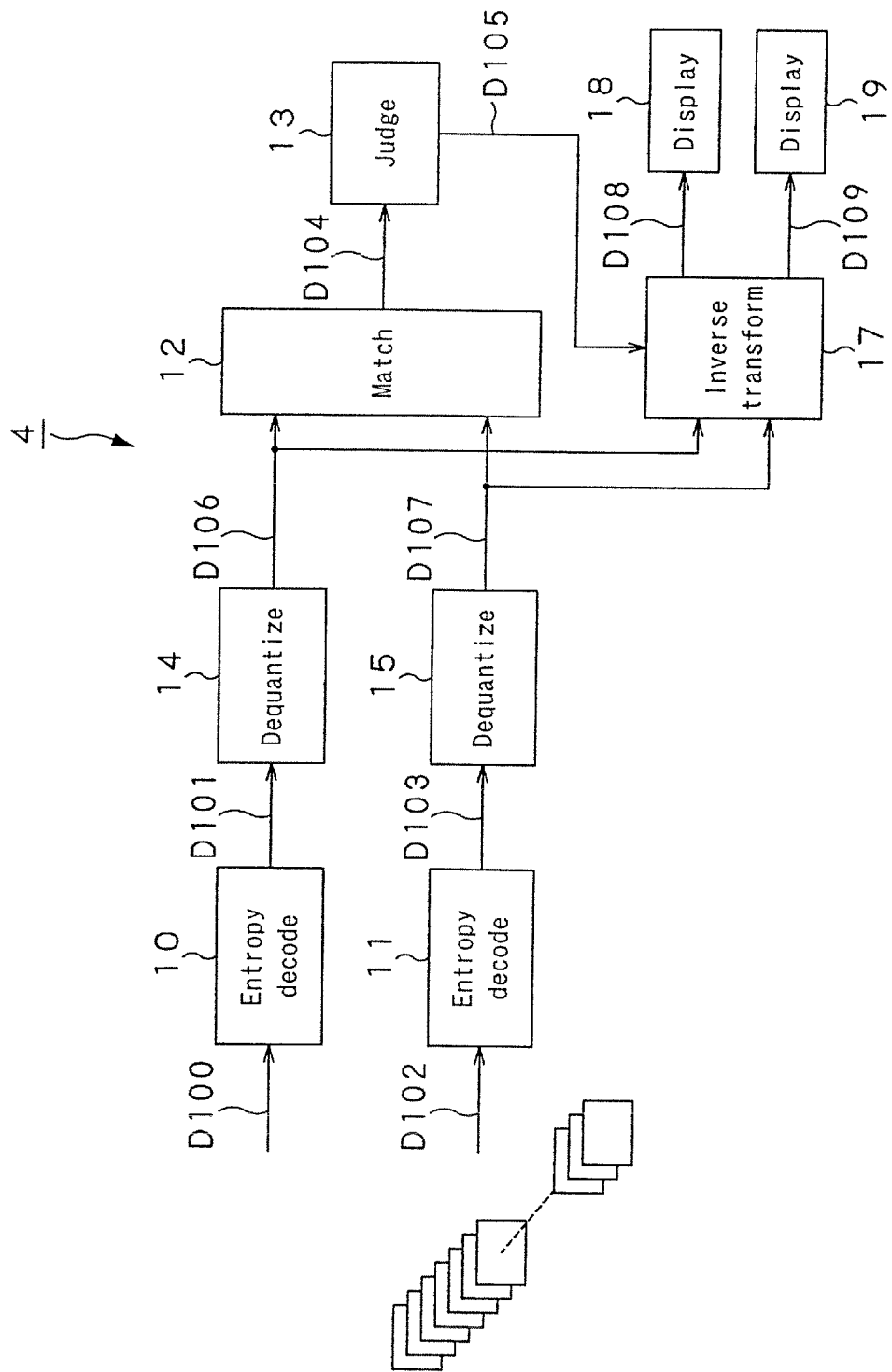
FIG. 6 is a schematic block diagram of an image search device as the third embodiment of the present invention, in which matching is made between the transform coefficients of a frame and those of a specific frame.

In the foregoing, there have been described the first and second embodiments in which the result of judgment from a judging unit 13 is supplied to outside. Next to these embodiments, a third and fourth embodiments will be illustrated and described in which the image of a specific frame and that of a frame decided to be generally coincident with the specific frame are displayed on display units, respectively, for visual checking of the frames. FIG. 5 is a schematic block diagram of an image search device as the third embodiment, generally indicated with a reference numeral 3, in which matching is made between quantization coefficients, corresponding in sample position to each other, and FIG. 6 is also a schematic block diagram of an image search device as the fourth embodiment, generally indicated with a reference numeral 4, in which matching is made between transform coefficients, corresponding in sample position to each other. It should be noted that the same elements of these image search devices 3 and 4 as those of the image search devices 1 and 2 shown in FIGS. 1 and 4, respectively, are indicated with the same reference numerals and will not be described in detail.

First, the image search device 3 will be illustrated and explained.

In this image search device 3, an entropy decoder 10 makes entropy decoding of an encoded code stream D100 of a specific frame according to a predetermined algorithm to provide quantization coefficients D101, and supplies the quantization coefficients D101 to a matching unit 12 and dequantizer 16. On the other hand, an entropy decoder 11 makes entropy decoding of an encoded code stream D102 of an object frame according to a predetermined algorithm to provide quantization coefficients D103 of the object frame, and supplies the quantization coefficients D103 to the matching unit 12 and dequantizer 16.

The matching unit 12 makes matching in sign (positive or negative) between ones, corresponding in sample position to each other, of the quantization coefficients D101 of the specific frame and those D103 of the object frame, and supplies the result of matching D104 to a judging unit 13. The judging unit 13 judges, based on the result of matching D104 supplied from the matching unit 12, whether the object and specific frames are generally coincident with each other. If the object and specific frames are decided to be generally coincident with each other, that is, if the quantization coefficients D101 of the specific frame are decided to be coincident in sign with those D103 of the object frame, corresponding in sample position to those D101 of the specific frame over all samples, the result of judgment D105 is supplied to the dequantizer 16.

When supplied with the result of judgment D105 that the object and specific frames are generally coincident with each other from the judging unit 13, the dequantizer 16 dequantizes the quantization coefficients D101 of the specific frame and those D103 of the object frame to provide transform coefficients D106 of the specific frame and transform coefficients D107 of the object frame, and supplies the transform coefficients D106 and D107 to an inverse transformer 17. The inverse transformer 17 makes inverse transform of the transform coefficients D106 of the specific frame and transform coefficients D107 of the object frame to provide a decoded image D108 of the specific frame and a decoded image D109 of the object frame, and displays the decoded images D108 and D109 on display units 18 and 19, respectively.

Next, the image search device 4 will be illustrated and explained.

In the image search device 4, a dequantizer 14 dequantizes quantization coefficients D101 of the specific frame to provide transform coefficients D106 of the specific frame, and supplied to the transform coefficients D106 to a matching unit 12 and inverse transformer 17. On the other hand, a dequantizer 15 dequantizes quantization coefficients D103 of the object frame to provide transform coefficients D107 of the object frame, and supplied the transform coefficients D107 to the matching unit 12 and inverse transformer 17.

The matching unit 12 makes matching in sign (positive or negative) between ones, corresponding in sample position to each other, of the transform coefficients D106 of the specific frame and those D107 of the object frame, and supplies the result of matching D104 to a judging unit 13. The judging unit 13 judges, based on the result of matching D104 supplied from the matching unit 12, whether the object and specific frames are generally coincident with each other. If the object and specific frames are decided to be generally coincident with each other, that is, if the transform coefficients D106 of the specific frame are decided to be coincident in sign with those D107 of the object frame, corresponding in sample position to those D101 of the specific frame over all samples, the result of judgment D105 is supplied to the inverse transformer 17. The inverse transformer 17 makes inverse transformation of the transform coefficients D106 of the specific frame and those D107 of the object frame to provide a decoded image D108 of the specific frame and a decoded image D109 of the object frame, and displays the decoded images D108 and D109 on display units 18 and 19, respectively.

In the image search devices 3 and 4, since the specific-frame image and frame image decided to be generally coincident with the specific-frame image are displayed on the display units 18 and 19, respectively, as above, it can actually be checked visually whether the specific and object frames are coincident with each other.

In the third and fourth embodiments, the frame image decided to be generally coincident with the specific-frame image is displayed on the display unit 17 only when the count is zero (0) at the time matching is over on all the samples. However, the image search devices 3 and 4 may be adapted such that in case there exists no frame of which the count is 0, a frame whose count is minimum is displayed on the display unit 17.

Fourth Embodiment

In the aforementioned first and second embodiments, the encoded code stream D100 of the specific frame is already known. A fourth embodiment will be explained herebelow in which a specific frame is available only as an original image.

Figure 7:
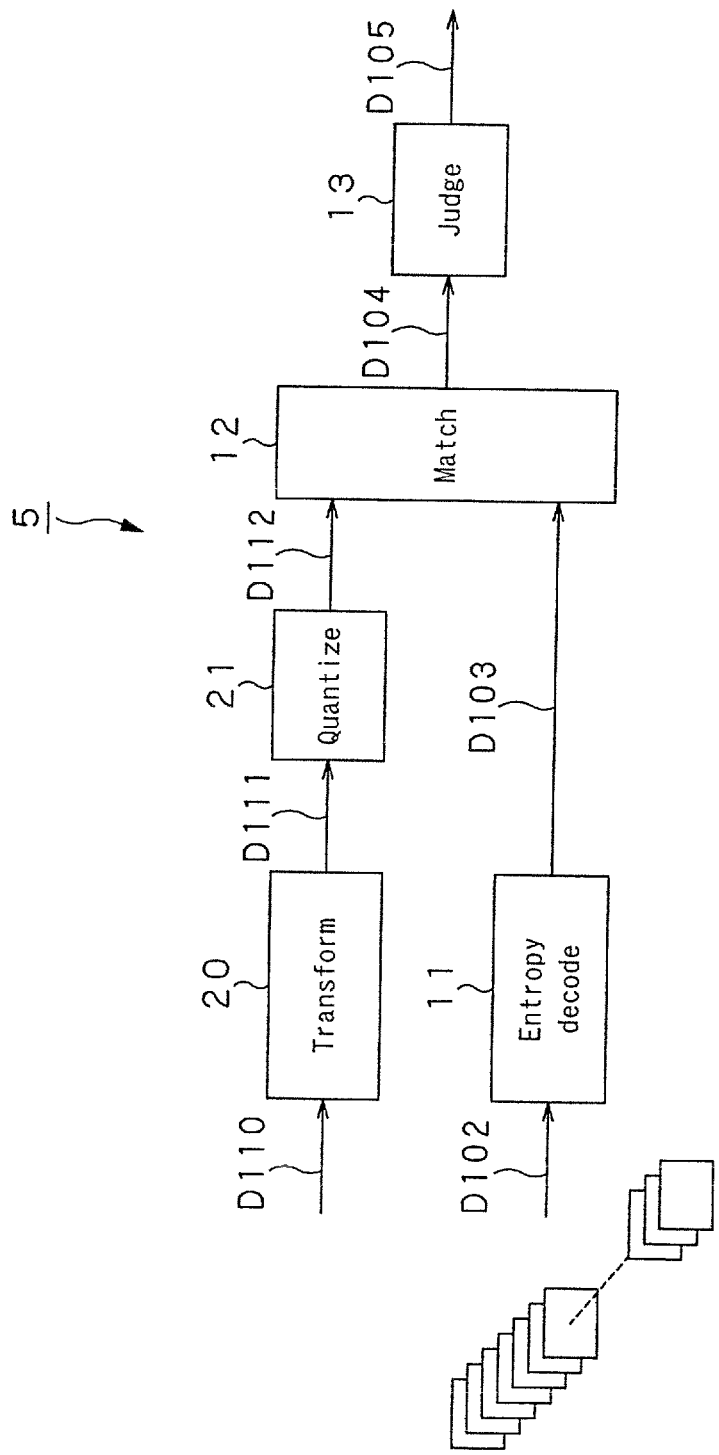
FIG. 7 is a schematic block diagram of an image search device as a fourth embodiment of the present invention, in which a specific frame exists in only an original image and matching is made between the quantization coefficients of a frame and those of the specific frame.

FIG. 7 is a schematic block diagram of an image search device, generally indicated with a reference numeral 5, in which matching is made between quantization coefficients corresponding in sample position to each other as in the first embodiment. In this image search device 5, a transformer 20 transforms a specific-frame image D110 according to a predetermined algorithm to provide transform coefficients D111, and supplies the transform coefficients D111 to a quantizer 21. The quantizer 21 quantizes the transform coefficient D111 of the specific frame to provide quantization coefficients D112, and supplies the quantization coefficients D112 to a matching unit 12. It should be noted that the following operations are similar to those in the first embodiment and will not be explained.

Figure 8:
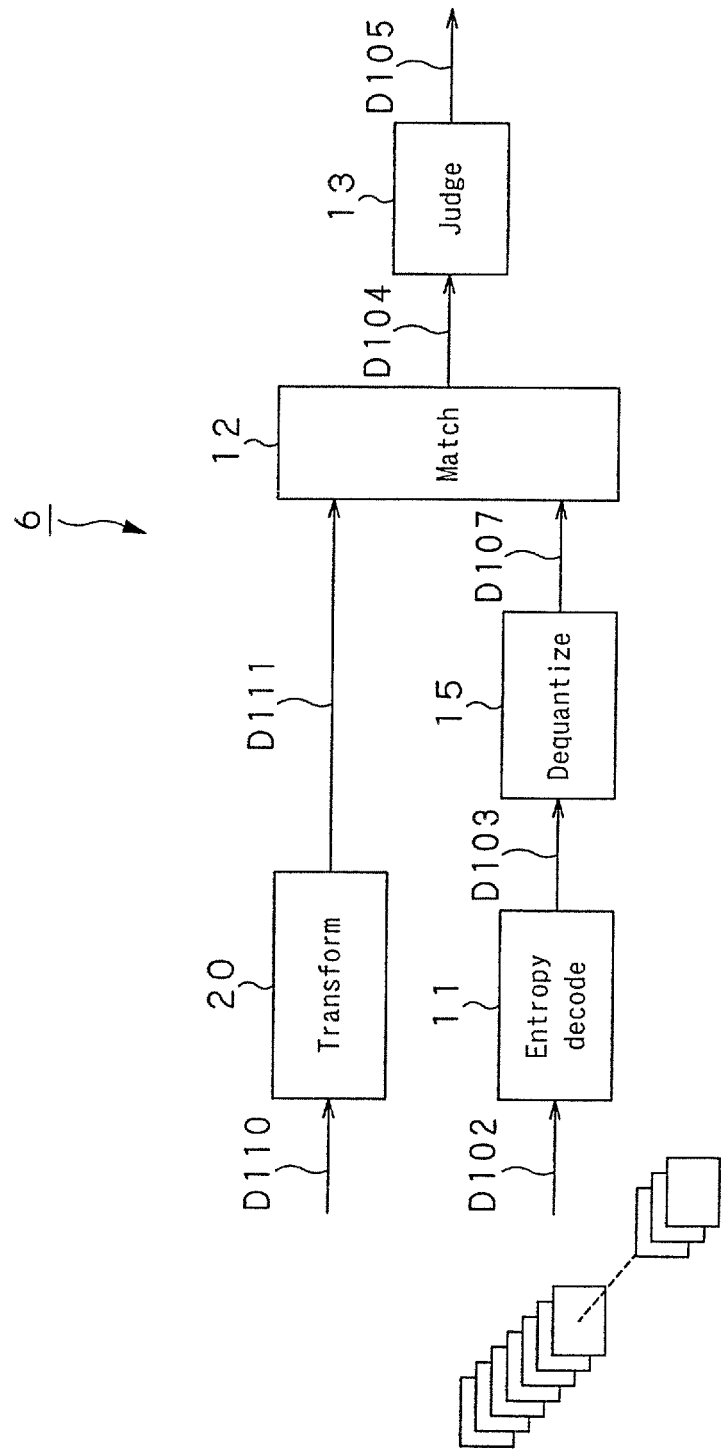
FIG. 8 is a schematic block diagram of an image search device as the fourth embodiment of the present invention, in which a specific frame exists in only an original image and matching is made between the transform coefficients of a frame and those of the specific frame.

FIG. 8 is also a schematic block diagram of an image search device, generally indicated with a reference numeral 6, in which matching is made between transform coefficients corresponding in sample position to each other as in the second embodiment. In the image search device 6, a transformer 20 transforms a specific-frame image D110 according to a predetermined algorithm to provide transform coefficients D111, and supplies the transform coefficients D111 to a matching unit 12. It should be noted that the following operations are similar to those in the second embodiment and will not be explained.

As above, the image search devices 5 and 6 as the fourth embodiment can search a frame image generally coincident with a specific-frame image with a smaller amount of calculation even if the specific frame is available only as an original image.

Fifth Embodiment

Note that in the foregoing description of the first to fourth embodiments, there has not been described in detail the algorithms for the entropy decoders 10 and 11, dequantizers 14 to 16, inverse transformer 17, transformer 20 and quantizer 21. Here will be illustrated and explained a fifth embodiment of the present invention in which JPEG is adopted as an image compression technique. At present, JPEG is the most prevalent image compression technique for use in a digital camera and camcorder to compress still pictures.

Figure 9:
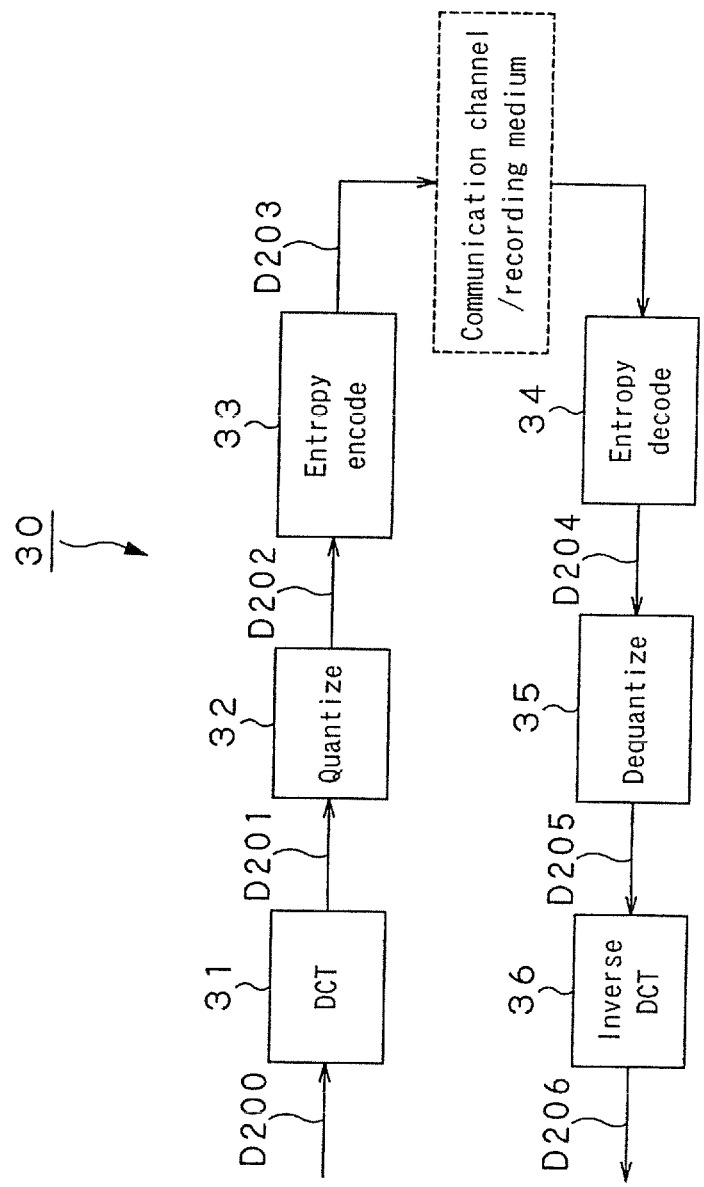
FIG. 9 is a schematic diagram of an image codec conforming to JPEG, adopted in an image search device as a fifth embodiment of the present invention.

FIG. 9 is a schematic block diagram of an image codec (encoder/decoder) as the fifth embodiment to encode and decode an input image signal according to JPEG. This image codec is described herein as a reference. As shown in FIG. 9, the image codec, generally indicated with a reference numeral 30, includes a DCT (Discrete Cosine Transform) transformer (will be referred to as "DCT transformer" hereunder) 31, quantizer 32, entropy encoder 33, entropy decoder 34, dequantizer 35 and inverse DCT transformer (will be referred to as "inverse DCT transformer" hereunder) 36.

Figure 10:
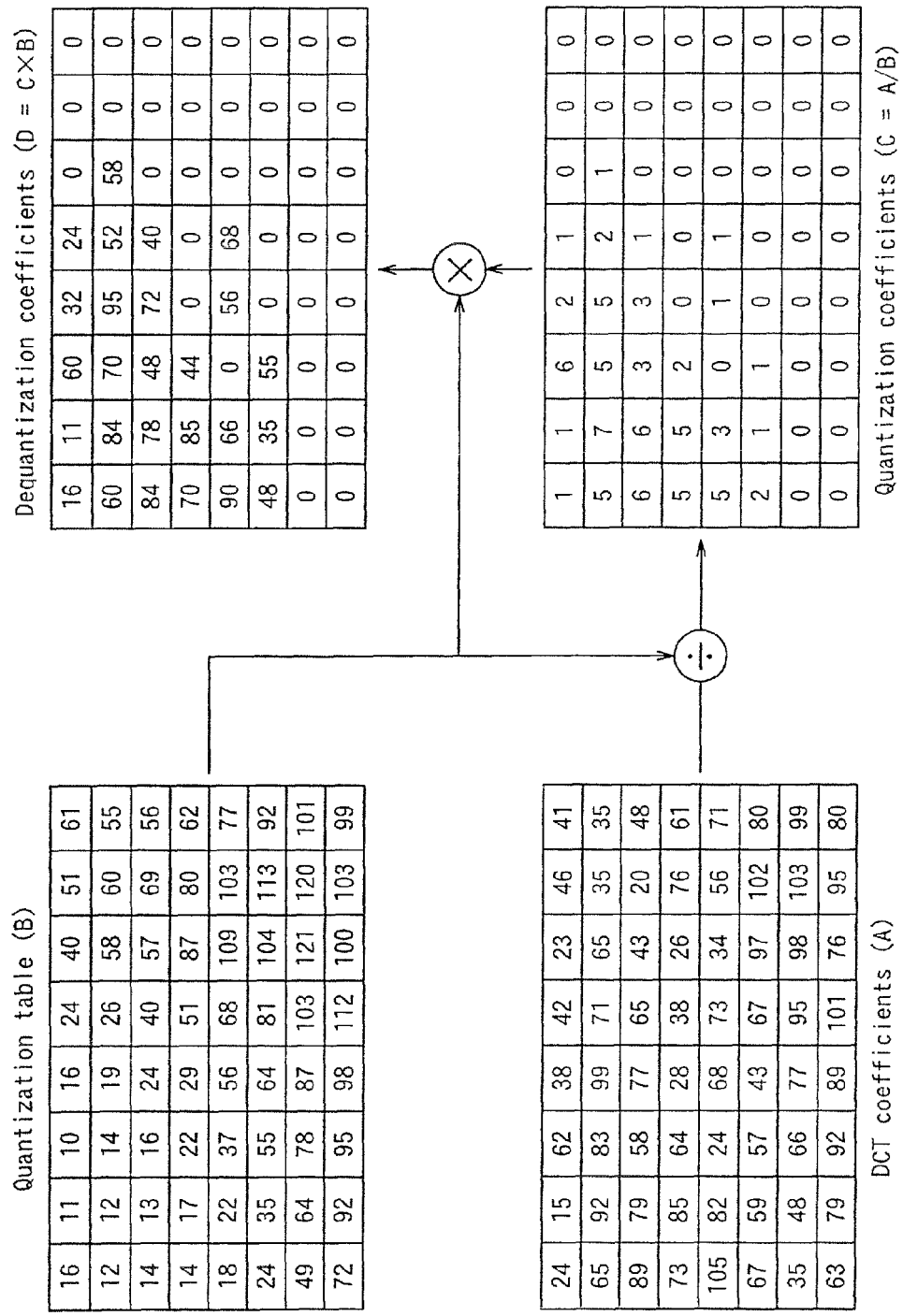
FIG. 10 explains the quantization and dequantization defined in JPEG.

In the image codec 30, the DCT transformer 31 is supplied with an image signal D200 and makes discrete cosine transform (DCT) of the input image signal D200 to generate DCT coefficients D201. Using a matrix-shaped quantization table, the quantizer 32 quantizes the DCT coefficients D201 to generate quantization coefficients D202. This quantization (and the dequantization which will further be described later) is illustrated in FIG. 10. According to JPEG, 8 by 8 DCT coefficients (A) are determined as shown in FIG. 10 because DCT is made in units of 8×8 pixels (8 vertical pixels by 8 horizontal pixels). Thereafter, these DCT coefficients (A) are divided by a quantization table (B) stored and held in a ROM (read-only memory) or the like (not shown) to calculate quantization coefficients (C=A/B). The entropy encoder 33 encodes the quantization coefficients D202 to generate an encoded code stream D203, and sends the encoded code stream D203 to a communication channel/recording medium. It should be noted here that the entropy encoder 33 makes variable-length coding with reference to a variable-length table to determine a code corresponding to the run and level of an appearing quantization coefficient. Generally, the variable-length table is a predetermined one stored in a memory.

The entropy decoder 34 decodes the encoded code stream D203 sent from the communication channel/recording medium to generate quantization coefficients D204. It should be noted here that the entropy decoder 34 makes variable-length decoding that is opposite to the operation of the entropy encoder 33. That is, the entropy decoder 34 determines a run and length corresponding to an appearing code with reference to the variable-length table to generate the quantization coefficients D204. The dequantizer 35 dequantizes the quantization coefficients D204 with the use of the aforementioned quantization table to generate transform coefficients D205, as shown in FIG. 10. Each coefficient in the quantization coefficients (C) is multiplied by a corresponding one in the quantization table (B) to calculate dequantization coefficients (D=C×B) as shown in FIG. 10. The inverse DCT transformer 36 makes inverse DCT of the transform coefficients D205 to provide a decoded image signal D206, and supplies this signal to outside.

In case JPEG is used as the image compression technique, the aforementioned entropy decoders 10 and 11 correspond to the entropy decoder 34 that determines a run and level corresponding to an appearing code with reference to the variable-length table. Also, the dequantizers 14 to 16 and quantizer 21 correspond to the dequantizer 35 and quantizer 32 each using the quantization table, respectively. Also, the inverse transformer 17 and transformer 20 correspond to the inverse DCT transformer 36 that makes inverse DCT and DCT transformer 31 that makes DCT, respectively. Therefore, the aforementioned matching unit 12 will make matching between quantization coefficients corresponding in sample position to each other or DCT coefficients corresponding in sample position to each other.

Sixth Embodiment

In the above, there has been described the fifth embodiment using JPEG as the image compression technique. Here will be illustrated and explained a sixth embodiment that uses JPEG 2000 as the image compression technique. JPEG 2000 is the international standard still picture/moving picture compression technique standardized by the ISO/IEC/JTC1 International Commission, and it is expectable to be increasingly prevalent instead of JPEG.

Figure 11:
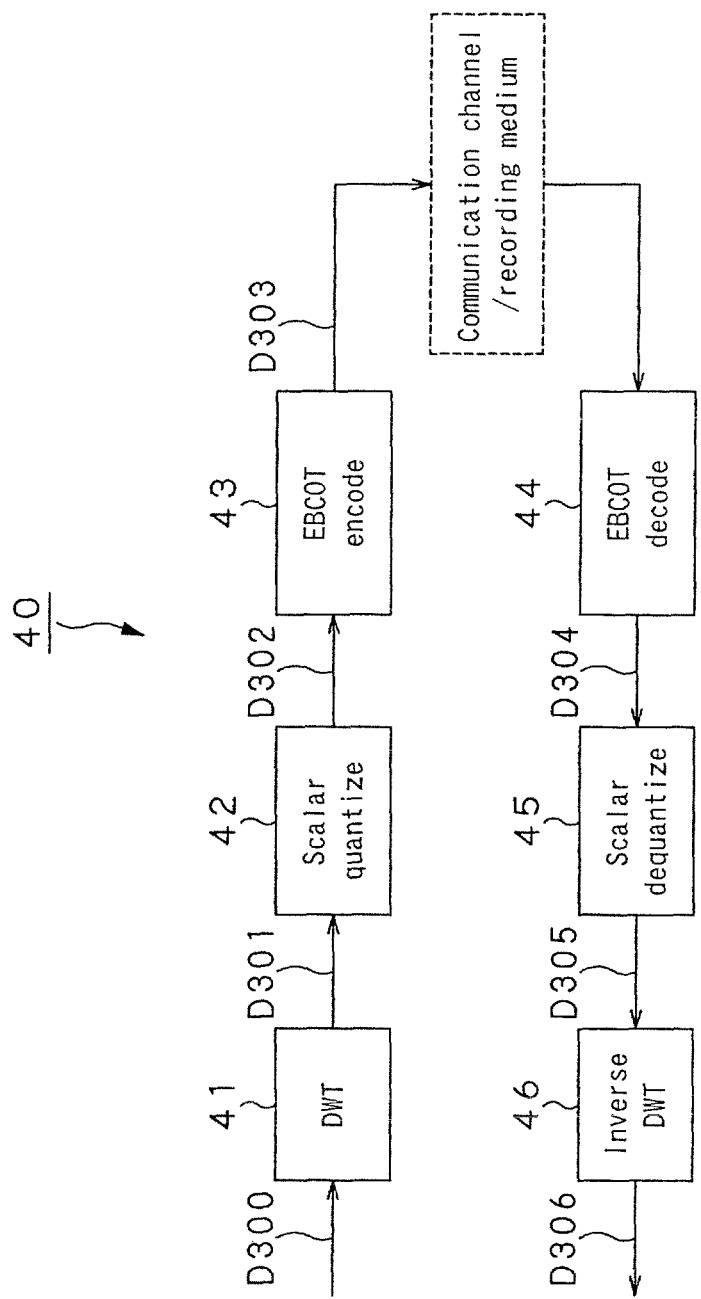
FIG. 11 is a schematic diagram of an image codec conforming to JPEG 2000, adopted in an image search device as a sixth embodiment of the present invention.

FIG. 11 is a schematic block diagram of an image codec to encode and decode an input image signal according to JPEG 2000. This image codec is described herein as a reference. As shown in FIG. 11, the image codec, generally indicated with a reference numeral 40, includes a DWT (Discrete Wavelet Transform) transformer 41, scalar quantizer 42, EBCOT (Embedded Block-based Coding with Optimized Truncation) encoder 43, EBCOT decoder 44, scalar dequantizer 45 and an inverse DWT transformer 46.

Figure 12:
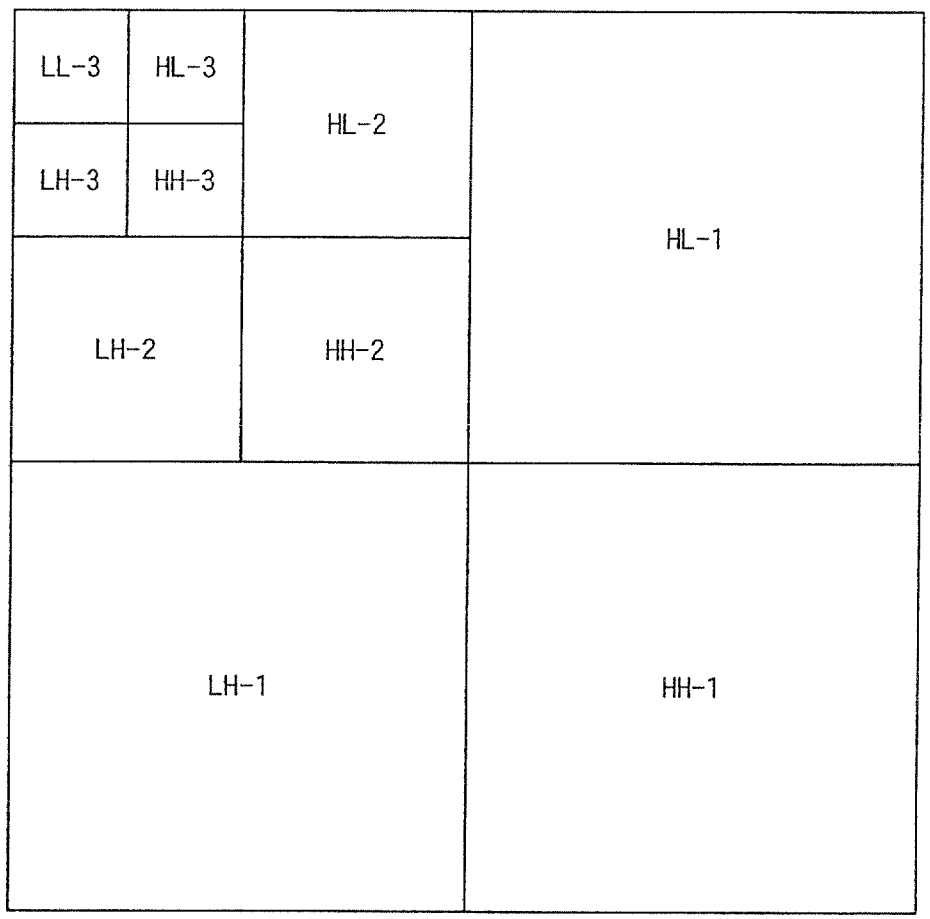
FIG. 12 explains the sub band when an image has been subjected to wavelet transformation three times.
Figure 13B:
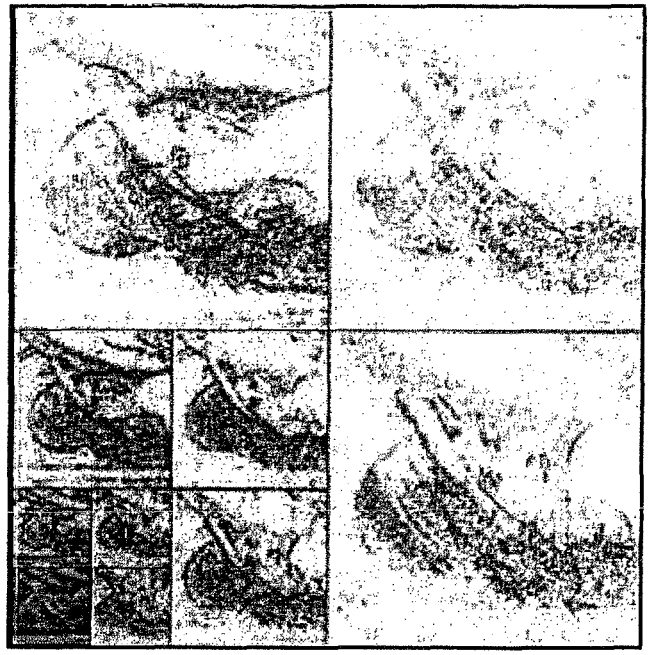
FIG. 13 explains the sub band when a test image has been subjected to wavelet transformation.
Figure 13A:
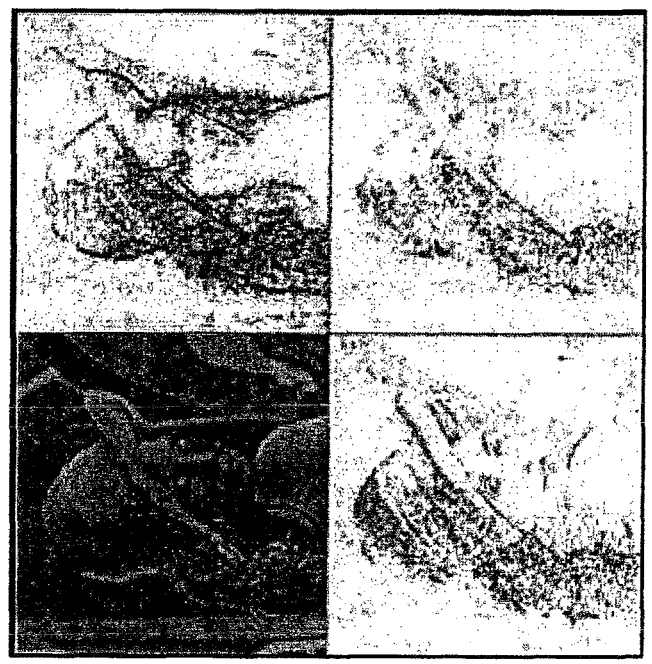

In the image codec 40, the DWT transformer 41 makes DWT of an input image signal D300 to generate DWT coefficients D301. It should be noted here that the DWT is represented by a filter bank composed of a low-pass filter and high-pass filter and DWT of an image including a two-dimensional signal adds to the number of sub bands formed by dividing a band correspondingly to the number of dividing steps in the DWT as shown in FIG. 12. FIG. 12 shows an example of dividing a band 3 times to form a total of 10 sub bands ranging from LL-3 (lowest-hand component) to HH-1 (highest-band component). FIG. 13A shows sub bands formed by making DWT of a test image once, and FIG. 13B shows sub bands formed by making DWT of the test image three times.

Figure 14:
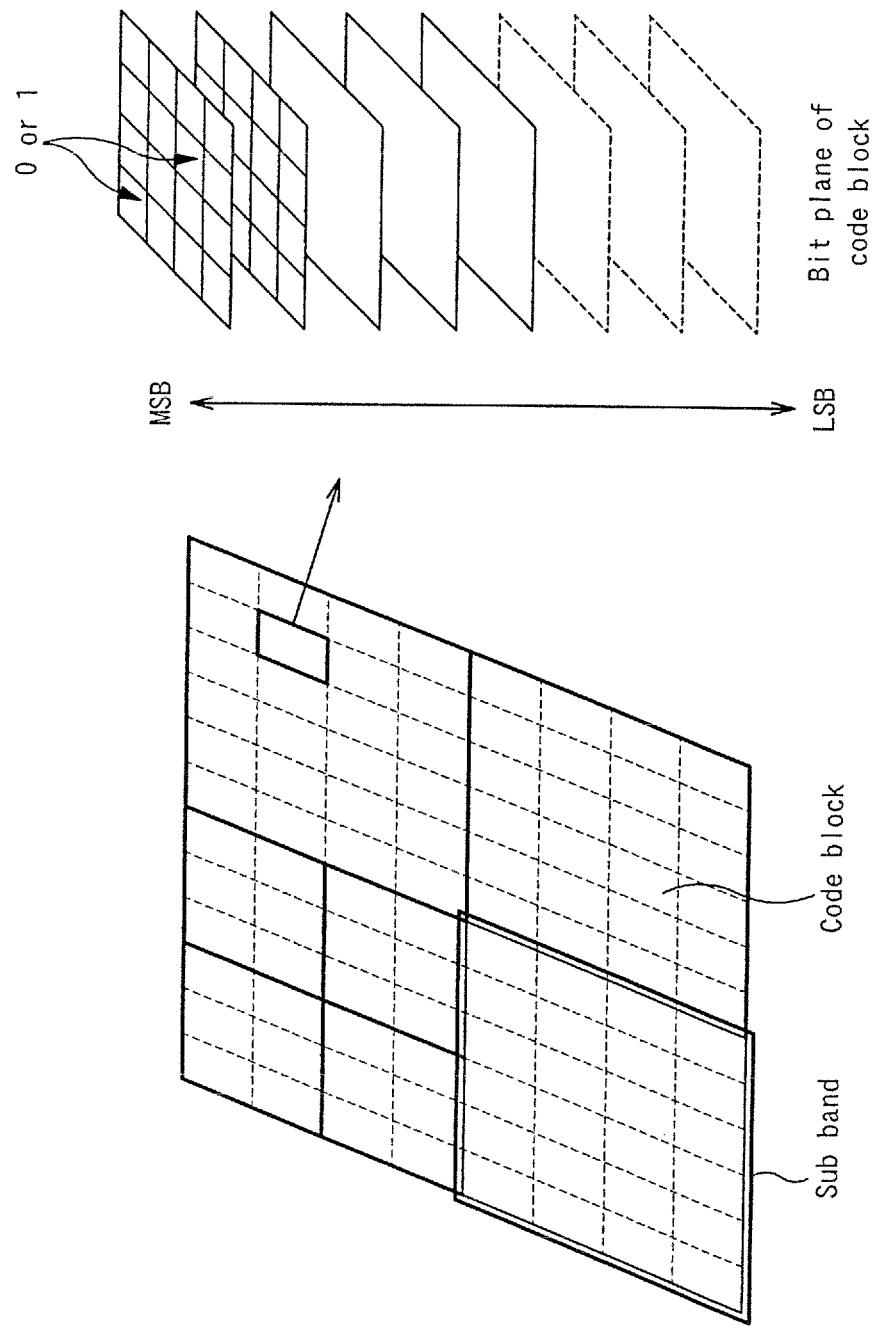
FIG. 14 shows the relation among the sub band, code block and bit plane in JPEG 2000.

Description will be made again with reference to FIG. 11. The scalar quantizer 42 quantizes the DWT coefficients D301 of each sub band with the scalar quantization technique defined in JPEG 2000 to generate quantization coefficients D302 of each sub band. The EBCOT encoder 43 encodes the quantization coefficients D302 with the EBCOT technique defined as an entropy coding technique in JPEG 2000 to generate an encoded code stream D303, and sends the encoded code stream D303 to the communication channel/recording medium. More particularly, the EBCOT encoder 43 divides a sub band into code blocks having a predetermined size as shown in FIG. 14. The size of a code block is frequently 32×32 or 64×64. The quantization coefficient D302 of each code block is developed into a bit plane as a set of binary coefficient bits (0 or 1) and the coefficient bits are encoded in units of a bit plane.

The EBCOT decoder 44 decodes the encoded code stream D303 sent from the communication channel/recording medium with the technique defined in JPEG 2000 to generate quantization coefficients D304. The scalar dequantizer 45 dequantizes the quantization coefficients D304 to generate DWT coefficients D305, and the inverse DWT transformer 46 makes inverse DWT of the DWT coefficients D305 to provide a decoded image signal D306.

In case JPEG 2000 is used as the image compression technique, the aforementioned entropy decoders 10 and 11 correspond to the EBCOT decoder 44. Also, the dequantizers 14 to 16 and quantizer 21 correspond to the scalar dequantizer 45 and scalar quantizer 42. Also, the inverse transformer 17 and transformer 20 correspond to the inverse DWT transformer 46 that makes inverse DWT and DWT transformer 41 that makes DWT, respectively. Therefore, the aforementioned matching unit 12 will make matching between quantization coefficients corresponding in sample position to each other or DWT coefficients corresponding in sample position to each other.

Seventh Embodiment

Figure 15:
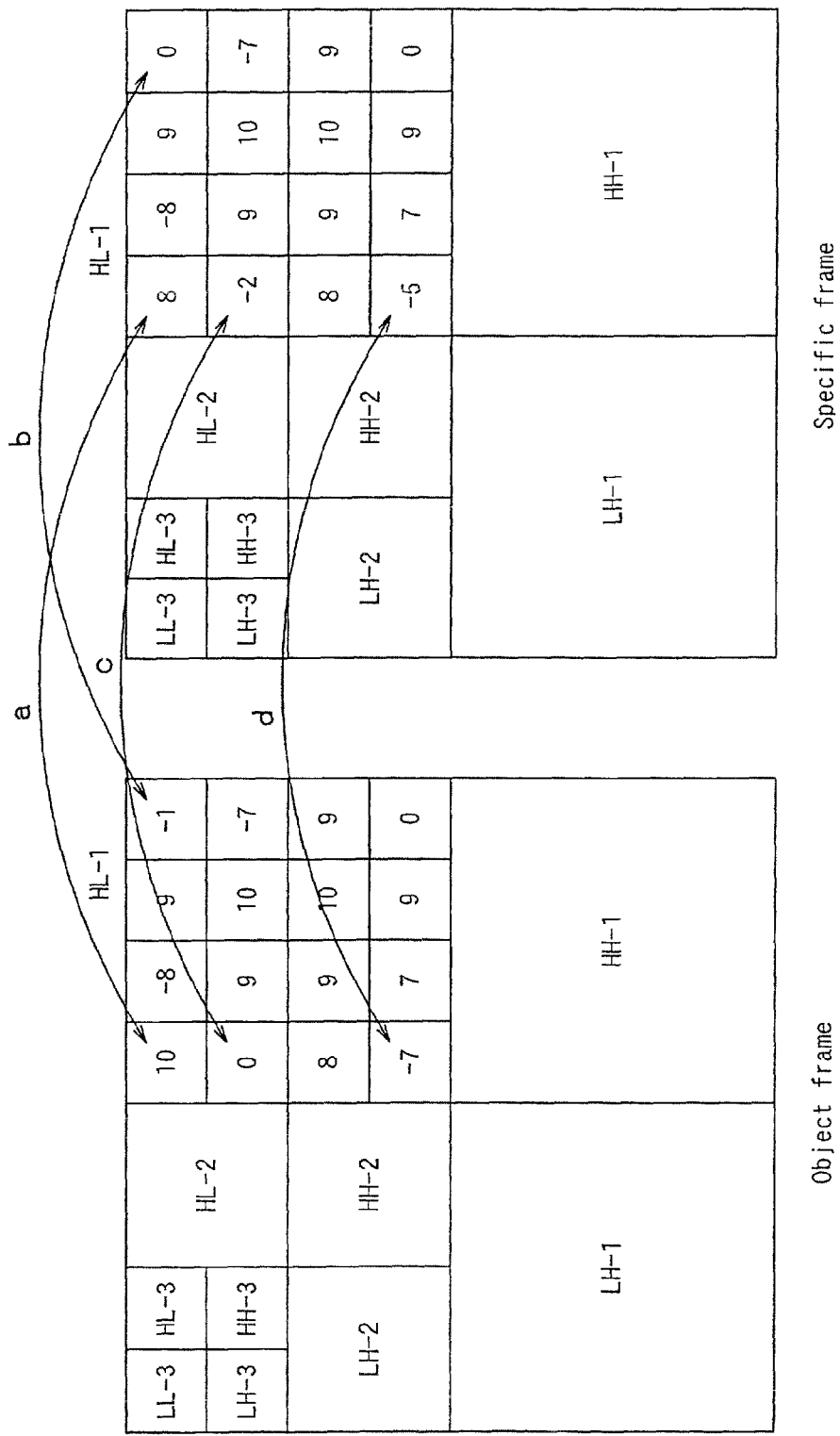
FIG. 15 shows an example of matching between coefficients in the HL-1 sub band in an image search device as a seventh embodiment of the present invention.

As having been described concerning the sixth embodiment, JPEG 2000 is such that an input image signal has the band thereof divided by DWT into sub bands each reflecting the feature of the image. For example, the energy of an image is most concentrated in the lowest band. Therefore, matching between quantization or DWT coefficients of each of sub bands resulted from the band division is most effective. An example of matching between coefficients of each HL-1 sub band is shown in FIG. 15. In FIG. 15, arrows a and d indicate coefficients different in absolute value from each other but coincident in sign (positive or negative) with each other and arrows b and c indicate coefficients any one of which is zero (0).

Figure 16:
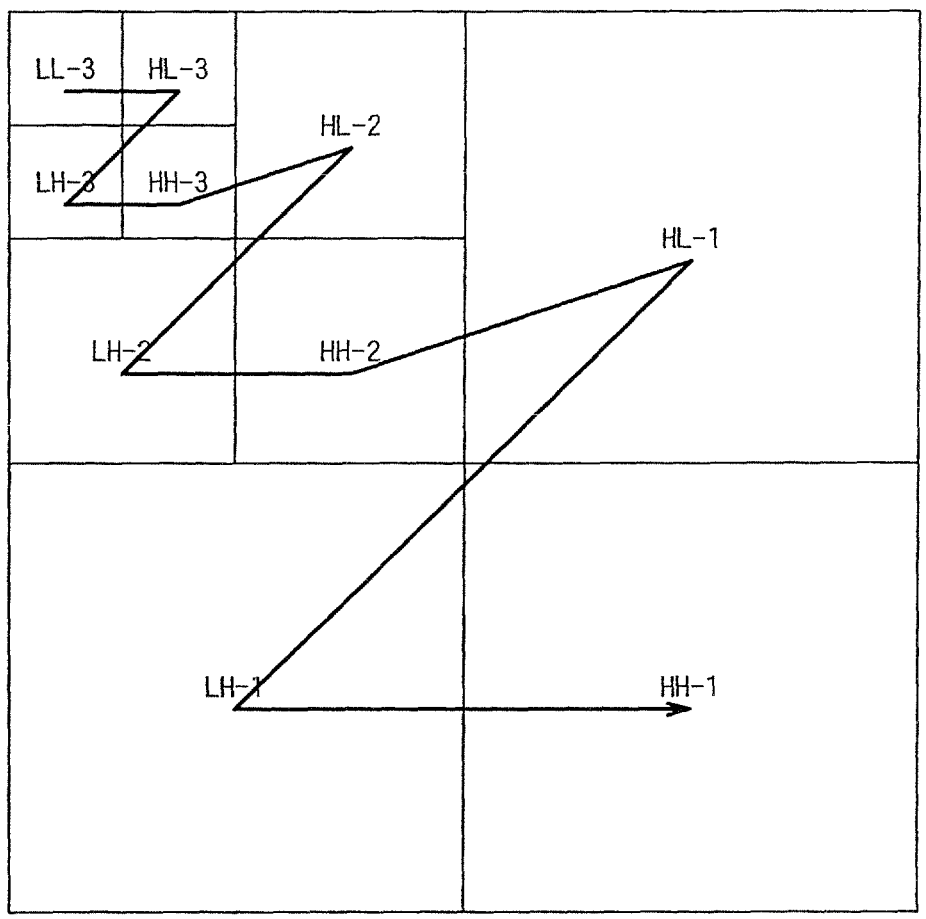
FIG. 16 shows the sequence of selecting a sub band when making matching between coefficients in each sub band.

Since the images are rather similar to each other in the low-band sub bands, different frame images are rather different in sign (positive or negative) from each other and many more coefficients being zero (0) appear in the high-band sub bands than in the low-band sub bands, so the sign judgment is not possible in many cases. On this account, matching between quantization or DWT coefficients should preferably be made in an order from a sub band in the lowest band toward a sub band in the highest band. For example, in case the DWT has been effected three times, matching between quantization or DWT coefficients should preferably be made of LL-3 (lowest-band sub band), LL-3, HL-3, LH-3, HH-3, HL-2, LH-2, HH-2, HL-1, LH-1 and HH-1 in this order as shown in FIG. 16.

Note that in case all the original images have positive values, the lowest-band components of the DWT and quantization coefficients have always positive signs. In this case, matching should be made starting with the coefficients of a sub band next to the lowest-band component.

Figure 17:
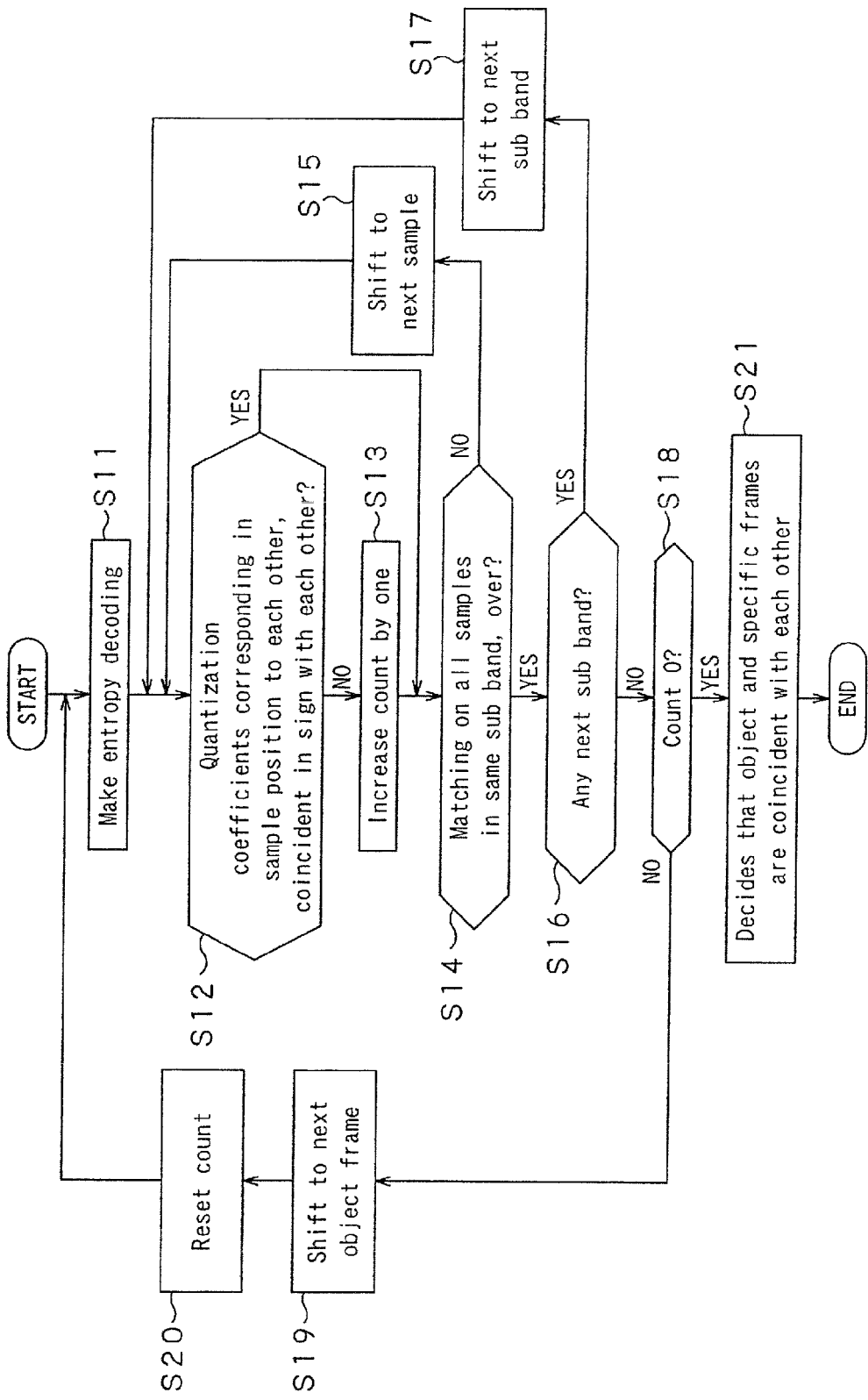
FIG. 17 shows a flow of operations made by the image search device in making matching between the quantization coefficients of a frame and those of a specific frame in each sub band.

FIG. 17 shows a flow of operations made by the image search device for matching between quantization coefficients of each sub band. First in step S11, the image search device makes entropy decoding of an encoded code stream of a specific frame and an encoded code stream of an object frame to generate quantization coefficients of the specific frame and quantization coefficients of the object frame.

Next in step S12, the image search device makes matching in sign (positive or negative) between ones, corresponding in sample position to each other, of the quantization coefficients of the specific frame and those of the object frame, and judges whether the quantization coefficients are coincident in sign with each other. In case the quantization coefficients are decided to be coincident in sign with each other, the image search device goes to step S14. If the quantization coefficients are decided not to be coincident in sign with each other, the image search device will increase the count of the counter by one in step S13 and then go to step S14. In step S14, the image search device judges whether the matching is over on all samples in the same sub band. If the matching is decided not to be over so, the image search device shifts to a next sample in step S15 and then returns to step S12. If the matching is decided to be over so, the image search device goes to step S16.

Next in step S16, the image search device judges whether there exists a next sub band. In case it is decided that a next sub band exists, the image search device shifts to the sub band in step S17 and then returns to step S12. On the contrary, if there is no next sub band, the image search device goes to step S18.

In step S18, the image search device judges whether the count is zero (0). In case the count is not zero, the image search device decides that the object frame is not coincident with the specific frame, it is supplied with an encoded code stream of a next object frame in step S19, it resets the count to zero in step S20, and then repeats the similar searching operations in step S11 and sub sequent steps. On the contrary, the count being zero means that the quantization coefficients are coincident in sign (positive or negative) with each other on all the samples. Thus, the image search device decides, in step S21, that the object frame is generally coincident with the specific frame, and it exits the searching procedure.

Note that although matching is to be done on all the samples in the flow diagram in FIG. 17, the searching procedure may be such that when the count has become larger than a predetermined threshold, the quantization coefficients are decided not to be coincident with each other and the image search device shifts to a next object frame, which is intended to reduce the time required for the searching procedure. More specifically, in case the object frame is to be decided as being generally coincident with the specific frame only when the count is zero (0) at the time the matching is over on all the samples, the time required for the searching procedure can be reduced by shifting to a next object frame when the count has become one (1).

Figure 18:
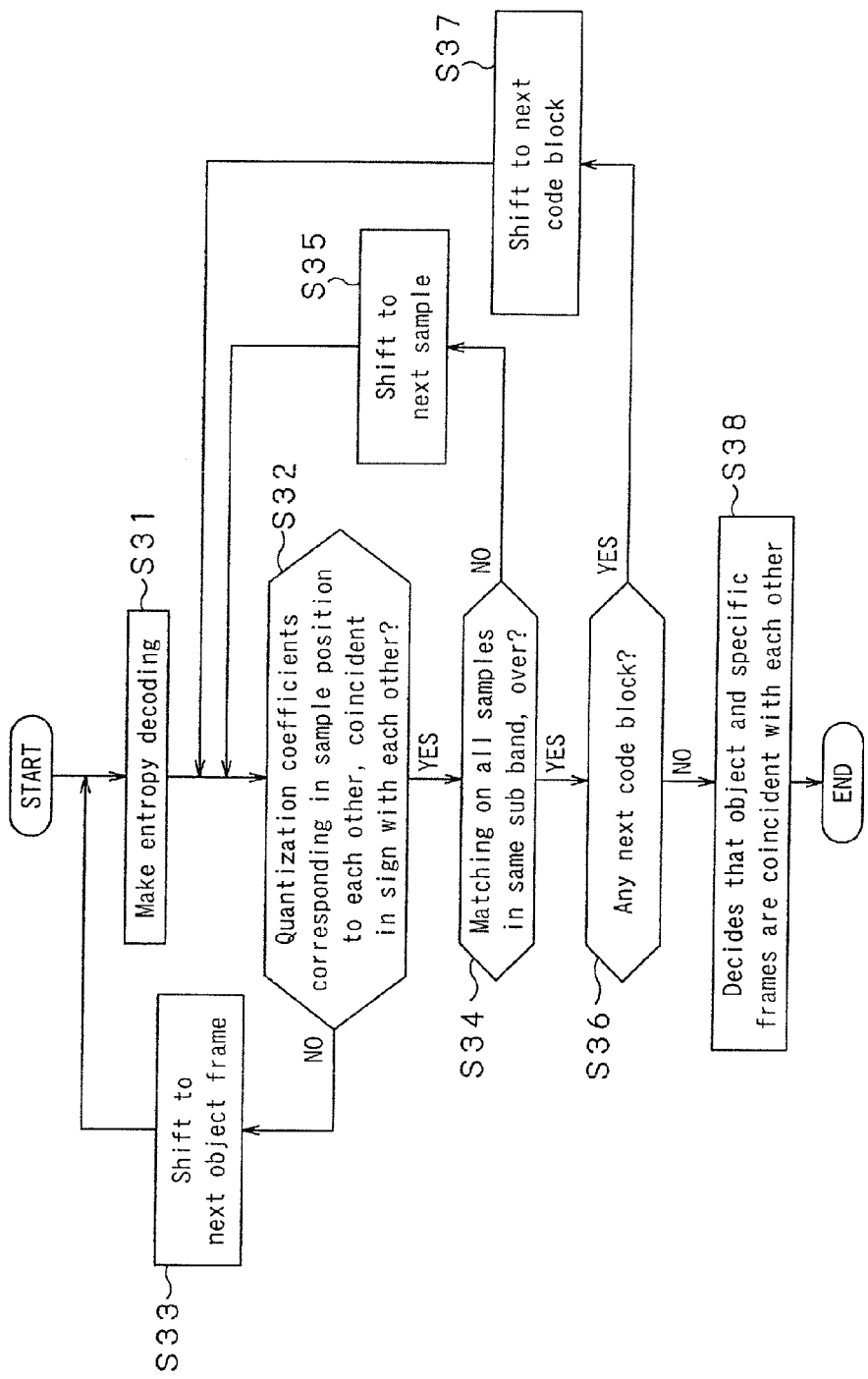
FIG. 18 shows a flow of operations made by the image search device in shifting to a next object frame when there appears even one quantization coefficient of the frame, not coincident in sign (positive or negative) with that of the specific frame.

FIG. 18 shows a flow of operations made by the image search device when shifting to a next object frame at the time even one quantization coefficient not coincident in sign (positive or negative) with a corresponding one appears. First in step S31, the image search device makes entropy decoding of an encoded code stream of a specific frame and an encoded code stream of an object frame to generate quantization coefficients of the specific frame and quantization coefficients of the object frame.

Next in step S32, the image search device makes matching in sign (positive or negative) between ones, corresponding in sample position to each other, of the quantization coefficients of the specific frame and those of the object frame to judge whether they are coincident in sign with each other. In case the quantization coefficients are found coincident in sign with each other, the image search device goes to step S34. If the quantization coefficients are decided not to be coincident in sign with each other, the image search device decides that the object frame is not coincident with the specific frame. In step S33, the image search device is supplied with an encoded code stream of a next object frame, and repeats the similar searching procedure starting at step S31.

Next in step S34, the image search device judges whether the matching is over on all the samples in the same code block. In case the matching is not over so, the image search device shifts to a next sample in step S35 and then returns to step S32. If the matching is over so, the image search device goes to step S36 where it will judge whether a next code block exists or not. In case a next code block exists, the image search device shifts to the next code block in step S37 and then returns to step S32. On the contrary, if there is no next code block, it means that the matching is over on all the samples. So, the image search device decides, in step S38, that the object frame is generally coincident with the specific frame, and exits the searching procedure.

In the foregoing, only when the count is zero (0) at the time the matching is over on all the samples, the image search device decides that the object frame is generally coincident with the specific frame. However, the image search device may be adapted to decide that the object frame is generally coincident with the specific frame when the count is smaller than the predetermined threshold at the time the matching is over on all the samples. In this case, there is a possibility that a plurality of candidate frames will appear, but it is possible to prevent any failure in search.

Note here that although the present invention has been explained above on the assumption that matching is to be done on all the samples unless any coefficients not coincident in sign with each other appear, the image search device may be adapted to make matching over to a predetermined code block or sub band included and no further matching.

Figure 19:
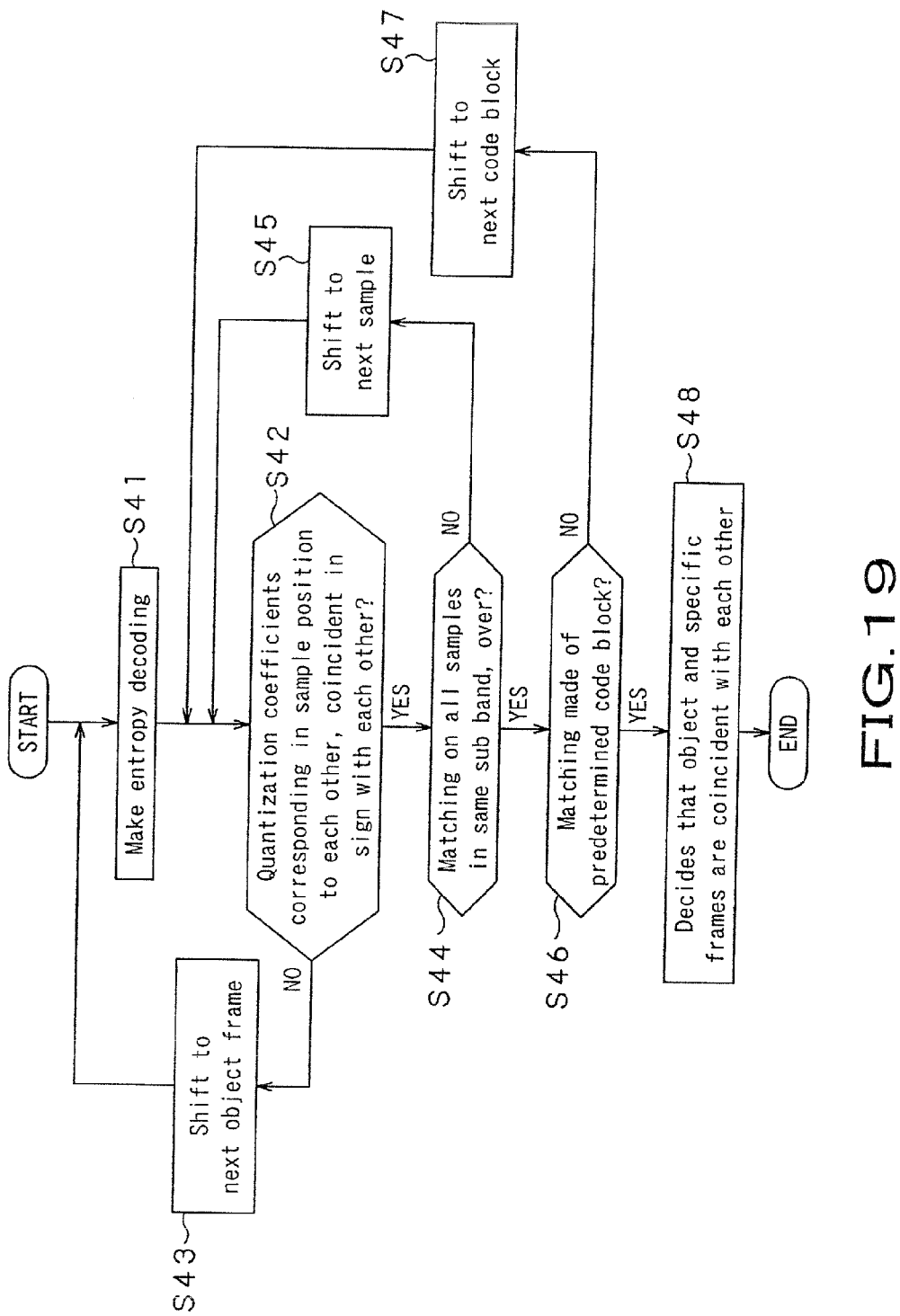
FIG. 19 shows a flow of operations made by the image search device in making matching between quantization over to a predetermined code block included and no further matching and in shifting to a next object frame when there appears even one quantization coefficient of the frame, not coincident in sign (positive or negative) with a corresponding one of the specific frame.

FIG. 19 shows a flow of operations made by the image search device in making matching between quantization coefficients over to a predetermined code block included and no further matching and in shifting to a next object frame when there appears even one quantization coefficient of the frame, not coincident in sign (positive or negative) with a corresponding one of the specific frame. First in step S41, the image search device makes entropy decoding of an encoded code stream of a specific frame and an encoded code stream of an object frame to generated quantization coefficients of the specific frame and those of the object frame.

Next in step S42, the image search device makes matching in sign (positive or negative) between ones, corresponding in sample position to each other, of the quantization coefficients of the specific frame and those of the object frame to judge whether they are coincident in sign with each other. In case the quantization coefficients are found coincident in sign with each other, the image search device goes to step S44. If the quantization coefficients are decided not to be coincident in sign with each other, the image search device decides that the object frame is not coincident with the specific frame. In step S43, the image search device is supplied with an encoded code stream of a next object frame, and repeats the similar searching procedure starting at step S41.

Next in step S44, the image search device judges whether the matching is over on all the samples in the same code block. In case the matching is not over so, the image search device shifts to a next sample in step S45 and then returns to step S42. If the matching is over so, the image search device goes to step S46 where it will judge whether the matching has been made of a predetermined code block. If the matching has not yet been made of the predetermined code block, the image search device shifts to a next code block in step S47 and then returns to step S42. On the contrary, if the matching has been made of the predetermined code block, it means that the matching is over on all the samples. So, the image search device decides, in step S48, that the object frame is generally coincident with the specific frame, and exits the searching procedure.

FIG. 20 shows the result of identification of a first code block in an encoded code stream actually formed by the compression coding conforming to JPEG 2000, in which disagreement was found between coefficients of a frame and those of a specific one. As shown in FIG. 20, the result of identification is such that disagreement between coefficients of a frame and those of a specific one was found in the first code block of 292 of a total of 300 frames, in the fourth code block of 3 frames and in the ninth code block of 57 frames. That is to say, disagreement was found in the first code block of most (97.3%) of the 300 frames. Therefore, there would resultingly not be any problem to make no further matching on the ninth code block. However, since the searching operations should be done with some flexibility for coping with various images, it will be effective to take code blocks counting, for example, 10% of all code blocks (168×10%=17 code blocks in this case) as object code blocks that are to be subjected to matching.

Eighth Embodiment

In the above seventh embodiment of the present invention, quantization coefficients in code blocks are subjected to matching after entropy decoding of all code blocks. However, since disagreement is found in the first code block of most of the frames as above, so no problem will arise in many cases even with matching being ceased halfway. Here will be illustrated and explained an eighth embodiment of the present invention in which entropy decoding of each code block and matching are made in parallel to reduce the amount of calculation for the entire searching procedure.

Figure 21:
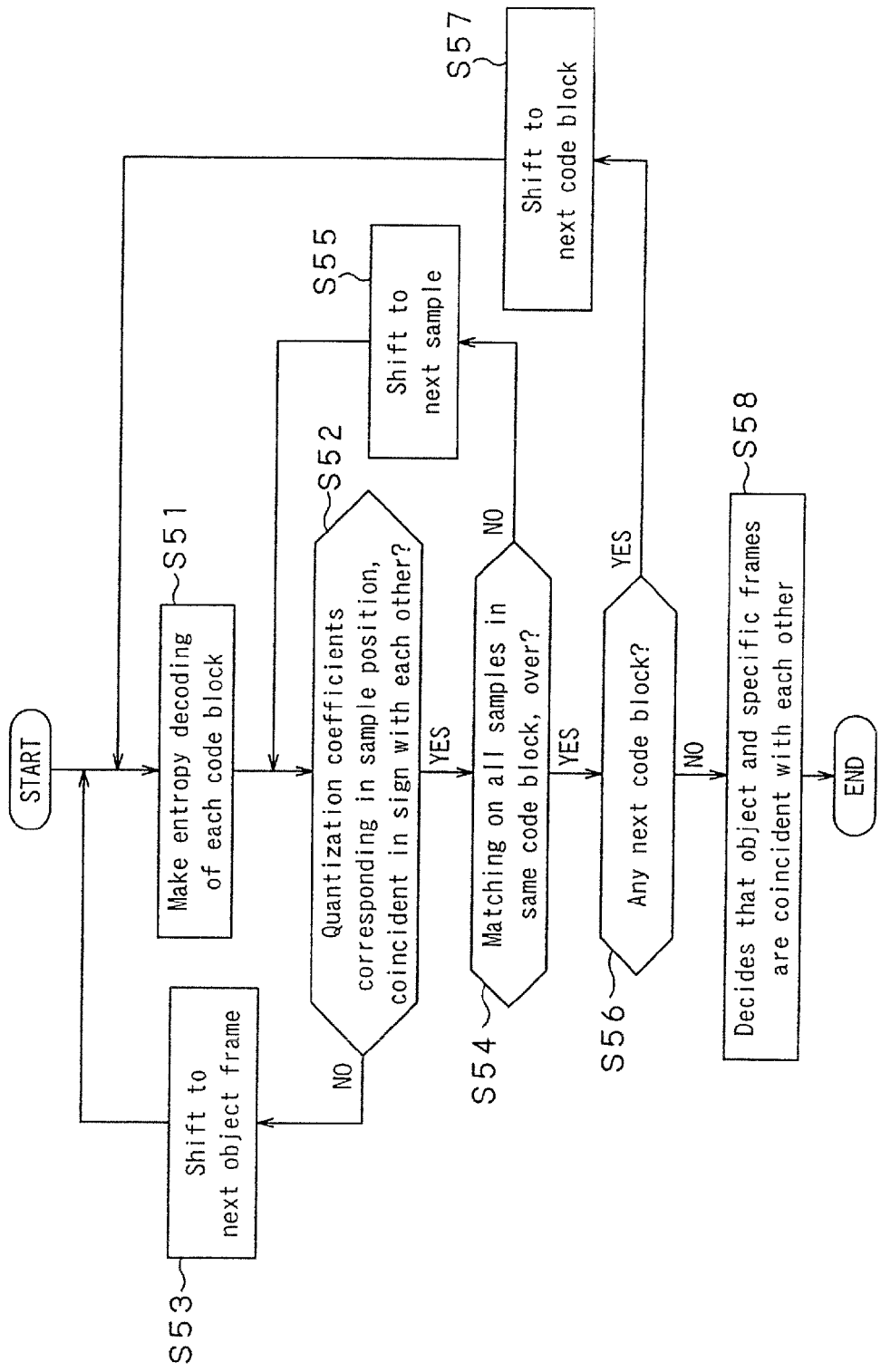
FIG. 21 shows a flow of operations made by an image search device as an eighth embodiment of the present invention in making entropy decoding of each code block and matching in parallel and in shifting to a next object frame when there appears even one quantization coefficients of a frame, not coincident in sign (positive or negative) with a corresponding one of a specific frame.

FIG. 21 shows a flow of operations made by an image search device as the eighth embodiment in making entropy decoding of each code block and matching in parallel and in shifting to a next object frame when there appears even one quantization coefficients of a frame, no coincident in sign (positive or negative) with a corresponding one of a specific frame. First in step S51, the image search device makes entropy decoding of one code block of an encoded code stream of a specific frame and one code block of an encoded code stream of an object frame to generate quantization coefficients of each code block of the specific frame and those of one code block of the object frame.

Next in step S52, the image search device makes matching in sign (positive or negative) between ones, corresponding in sample position to each other, of the quantization coefficients of each code block of the specific frame and those of each code block of the object frame to judge whether they are coincident in sign with each other. In case the coefficients are found coincident in sign with each other, the image search device goes to step S54. If the coefficients are not coincident in sign with each other, the image search device decides that the object frame is not coincident with the specific frame and goes to step S53 where it will be supplied with an encoded code stream of a next object frame and repeat the similar search procedure starting at step S51.

Next in step S54, the image search device judges whether the matching is over on all the samples in the same code block. In case the matching is not over so, the image search device shifts to a next sample in step S55 and then returns to step S52. If the matching is over so, the image search device goes to step S56 where it will judge whether a next code block exists or not. In case a next code block exists, the image search device shifts to the next code block in step S57 and then returns to step S51. On the contrary, if there is no next code block, it means that the matching is over on all the samples. So, the image search device decides, in step S58, that the object frame is generally coincident with the specific frame, and exits the searching procedure.

Also in this embodiment, the image search device may be adapted to make the matching over to a predetermined code block included and no further matching as in the seventh embodiment.

Figure 22:
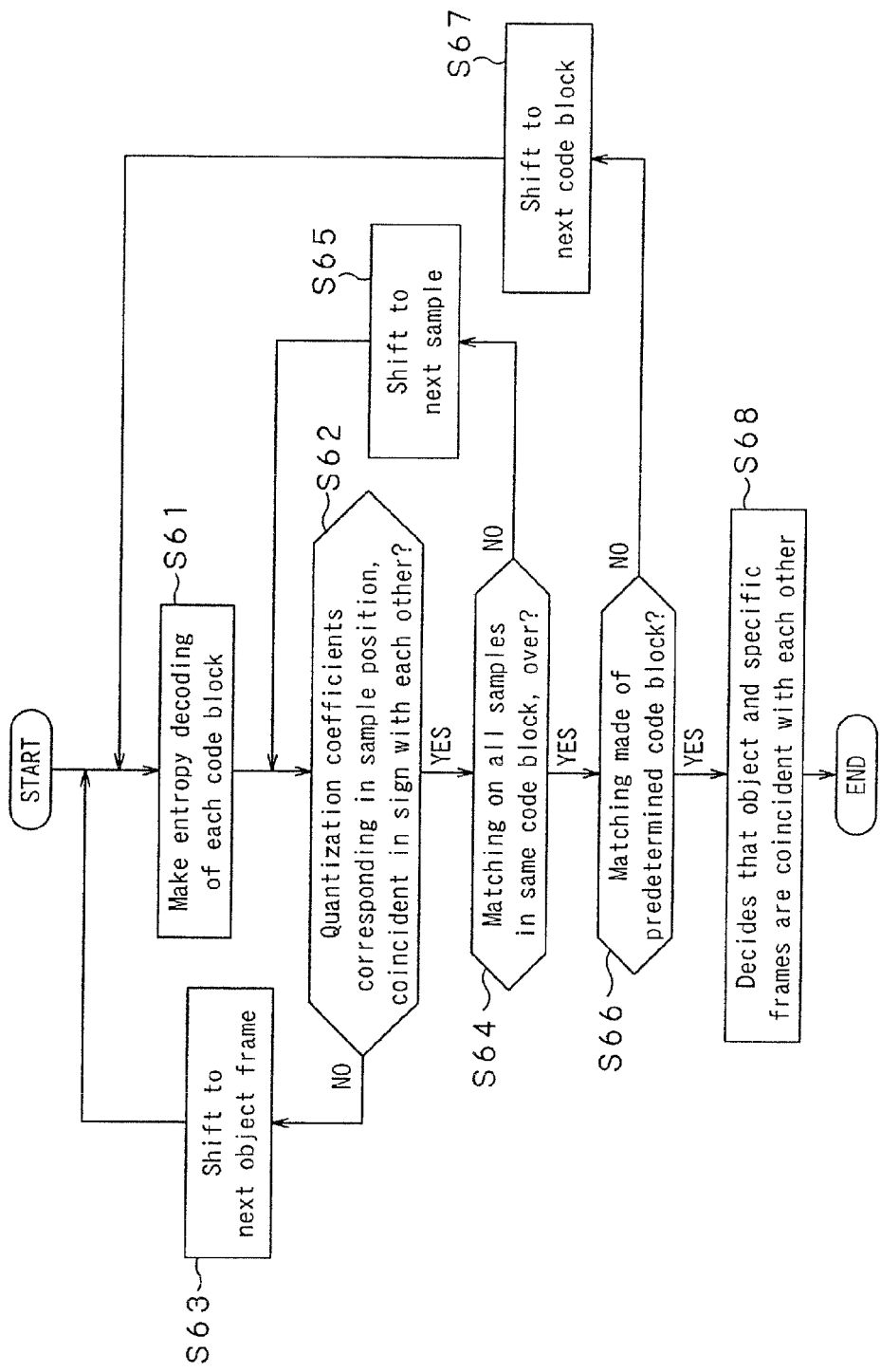
FIG. 22 shows a flow of operations made by the image search device as the eighth embodiment of the present invention in making matching between quantization coefficients over to a predetermined code block included and no further matching and in shifting to a next object frame when there appears even one quantization coefficient of the frame, not coincident in sign (positive or negative) with a corresponding one of the specific frame.

FIG. 22 shows a flow of operations made by the image search device in making matching between quantization coefficients over to a predetermined code block included and no further matching and in shifting to a next object frame when there appears even one quantization coefficient of the frame, not coincident in sign (positive or negative) with a corresponding one of the specific frame. First in step S61, the image search device makes entropy decoding of one code block of a specific frame and one code block of an object frame to generate quantization coefficients of each code block of the specific frame and those of each code block of the object frame.

Next in step S62, the image search device makes matching in sign (positive or negative) between ones, corresponding in sample position to each other, of the quantization coefficients of each code block of the specific frame and those of each code block of the object frame to judge whether they are coincident in sign with each other. In case the coefficients are found coincident in sign with each other, the image search device goes to step S64. If the coefficients are not coincident in sign with each other, the image search device decides that the object frame is not coincident with the specific frame and goes to step S63 where it will be supplied with an encoded code stream of a next object frame and repeat the similar search procedure starting at step S61.

Next in step S64, the image search device judges whether the matching is over on all the samples in the same code block. In case the matching is not over so, the image search device shifts to a next sample in step S65 and then returns to step S62. If the matching is over so, the image search device goes to step S66 where it will judge whether the matching has been made of a predetermined code block. In case the matching has been made of the predetermined code block, the image search device shifts to the next code block in step S67 and then returns to step S61. On the contrary, if the matching has not yet been made of the predetermined code block, it means that the quantization coefficients are coincident in sign with each other. So, the image search device decides, in step S68, that the object frame is generally coincident with the specific frame, and exits the searching procedure.

Ninth Embodiment

Note here that the aforementioned first to eighth embodiments have been illustrated and explained without referring to the configuration of the system to generate an encoded code stream of a specific frame and encoded code stream of an object frame. Here will be illustrated and explained a ninth embodiment and a system included in the image search device to generate an encoded code stream of a specific frame and encoded code stream of an object frame.

Figure 23:
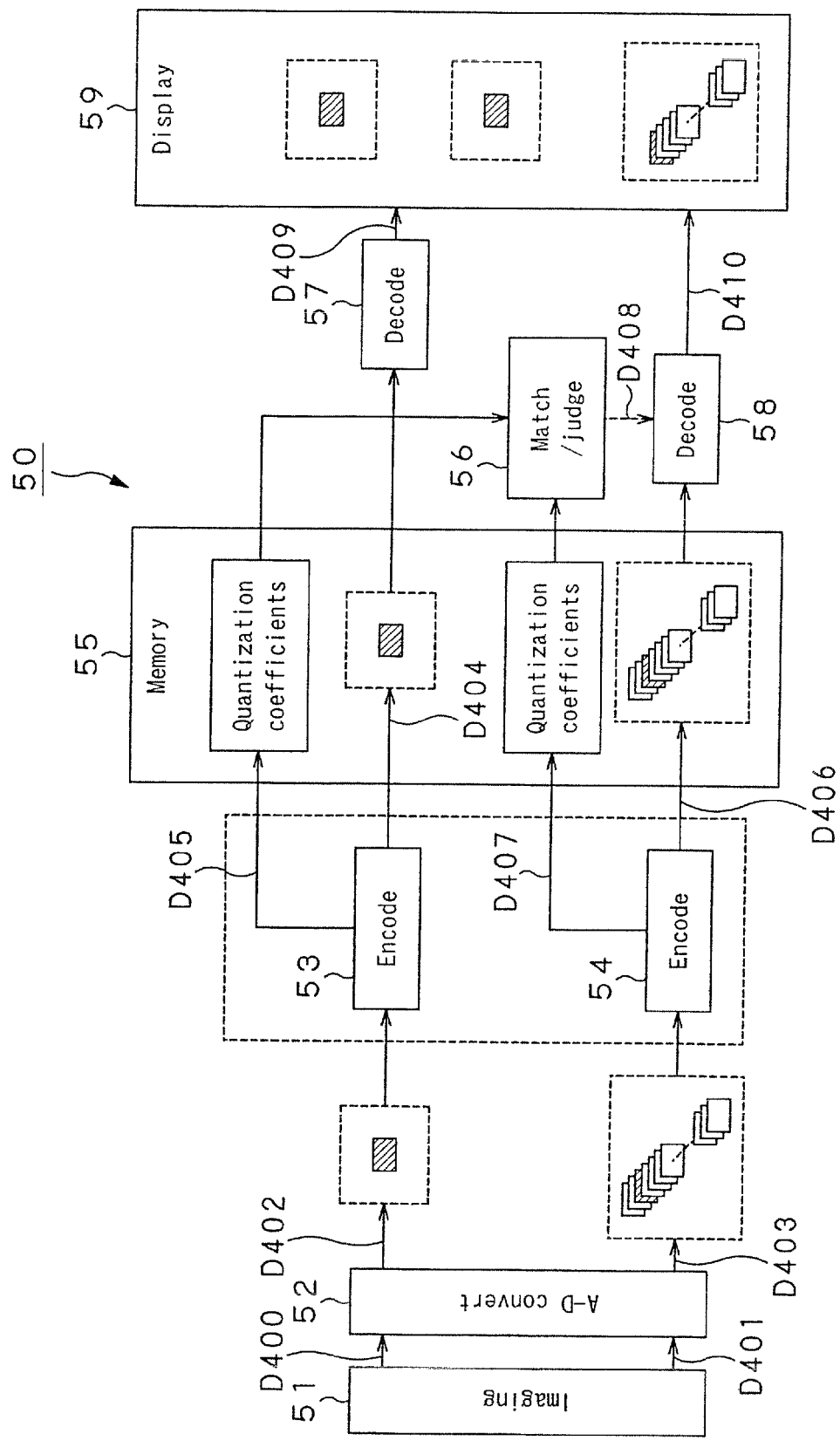
FIG. 23 is a schematic block diagram of an image search device as a ninth embodiment of the present invention.

FIG. 23 schematically illustrates, in the form of a block diagram, an image search device as the ninth embodiment of the present invention. As shown in FIG. 23, the image search device as the ninth embodiment, generally indicated with a reference numeral 50, includes an imaging unit 51, A-D converter 52, encoders 53 and 54, memory 55, matching/judging unit 56, decoders 57 and 58, and a display unit 59.

In the image search device 50, the imaging unit 51 is, for example, a CCD (charge-coupled device) camera to supply an image signal D400 acquired by imaging an object to the A-D (analog-to-digital) converter 52 which will make A-D conversion of the image signal D400 into image data D402 and supply this image data D402 to the encoder 53. The encoder 53 makes compression coding of the image data D402 according to a predetermined algorithm to generate an encoded code stream D404. It should be noted that the encoded code stream D404 is the aforementioned encoded code stream of the specific frame. The encoder 53 supplies quantization coefficients D405 generated in the course of the compression coding along with the encoded code stream D404 to a memory 55 which will store the encoded code stream D404 and quantization coefficients D405.

Similarly, the imaging unit 51 supplies a moving picture signal D401 acquired by imaging an object to the A-D converter 52 which will makes A-D conversion of the moving picture signal D401 to provide video data D403 and supply it to the encoder 53. The encoder 53 makes compression coding of the video data D403 according to a predetermined algorithm to generate an encoded code stream D406. It should be noted that the encoded code stream D406 is the aforementioned encoded code stream of the object frame. The encoder 53 supplies quantization coefficients D407 generated in the course of the compression coding along with the encoded code stream D406 to a memory 55 which will store the encoded code stream D406 and quantization coefficients D407.

The matching/judging unit 56 is similar to the aforementioned matching unit 12 and judging unit 13, and searches the encoded code stream D406 for a frame that is generally coincident with the specific frame. In case there is a frame generally coincident with the specific frame, the matching/judging unit 56 supplies the result of judgment D408 to the decoder 58, the decoder 58 decodes the frame generally coincident with the specific frame correspondingly to the result of judgment D408 to provide a decoded image D410, and supplies the decoded image D410 to the display unit 59. Also, the decoder 57 decodes the encoded code stream of the specific frame to provide a decoded image D409, and supplies the decoded image D409 to the display unit 59.

Since the image search device 50 as the ninth embodiment records, to the memory 55, the quantization coefficients D405 and D07 generated in the course of compression coding along with the encoded code stream D404 of the specific frame and encoded code stream D406 of the object frame, so it is possible to make matching between the quantization coefficients without having to make entropy decoding of the encoded code streams D404 and D406.

Note that although it has been described above that the decoded image D410 resulted from decoding of the frame generally coincident with the specific frame is displayed on the display unit 59, the present invention is not limited to this technique but the frame generally coincident with the specific frame may be taken as a playback starting frame and this playback starting frame and subsequent frames be decoded for display on the display unit 59. Also, the frame generally coincident with the specific frame may be taken as a playback ending frame and frames through this playback ending frame be decoded for display on the display unit 59.

It has been described above that the quantization coefficients D405 and D407 generated in the course of compression coding are recording to the memory 55 for use in making matching between them. However, the present invention is not limited to this technique but transform coefficients may be recorded to the memory 55 for use in making matching between them.

Tenth Embodiment

There has been described above the ninth embodiment in which both the specific-frame image and object moving picture are not compression-coded, namely, neither an encoded code stream and quantization coefficients of the specific frame nor an encoded code stream and quantization coefficients of the object frame are available. Here will be illustrated and explained a tenth embodiment in which at least either an encoded code stream and quantization coefficients of the specific frame or an encoded code stream and quantization coefficients of the object frame are already available.

Figure 24:
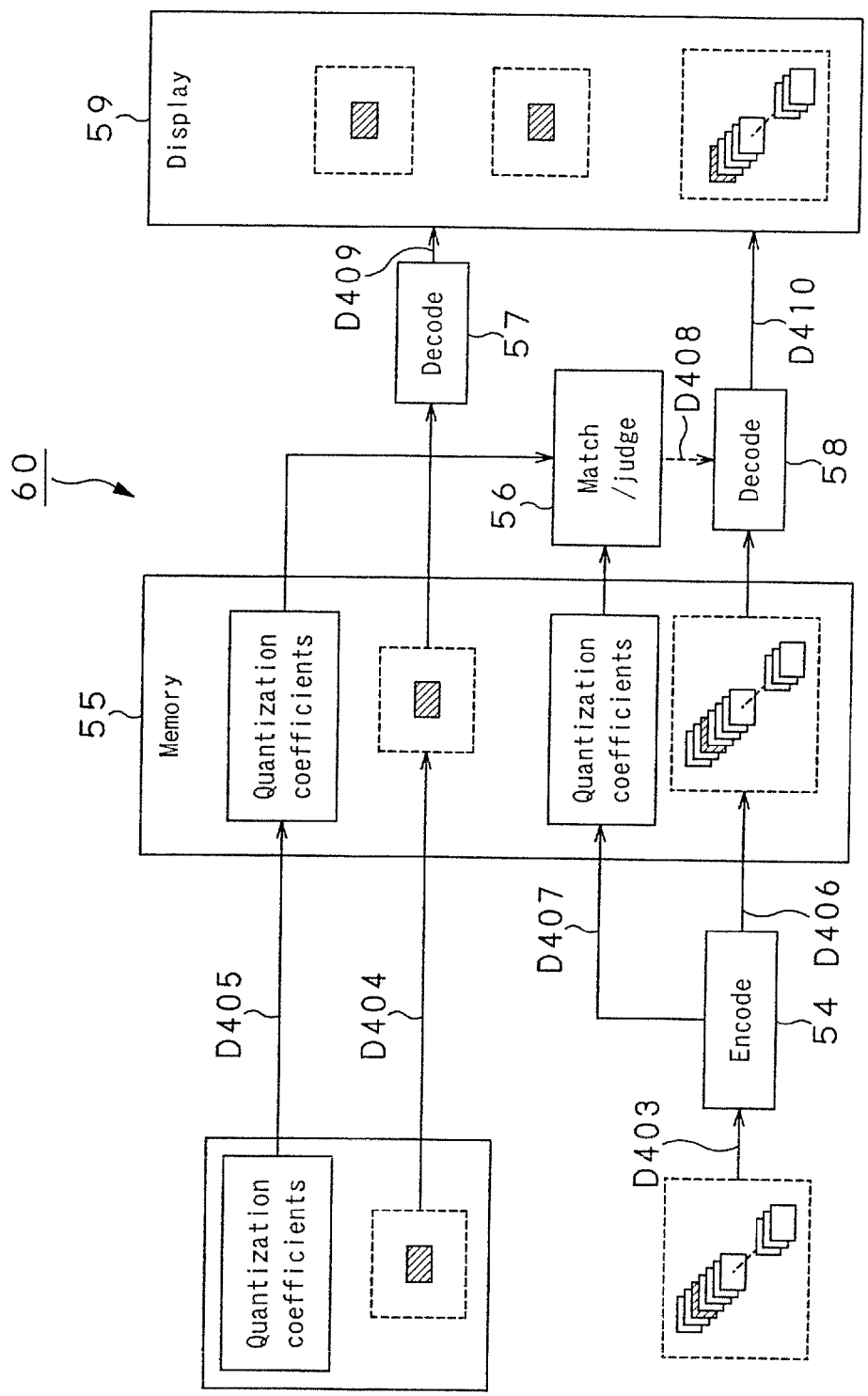
FIG. 24 is a schematic block diagram of an image search device as a tenth embodiment of the present invention in which there are already available an encoded code stream and quantization coefficients of a specific frame.

FIG. 24 is a schematic block diagram of an image search device as a tenth embodiment of the present invention in which there are already available an encoded code stream and quantization coefficients of a specific frame. The image search device is generally indicated with a reference numeral 60. In this image search device 60, an encoded code stream D404 and quantization coefficients D405 of a specific frame are copied or downloaded from a recording medium, external server or the like to a memory 55. Also, an encoder 53 makes compression coding of object video data D403 according to a predetermined algorithm to provide an encoded code stream D406, and records the encoded code stream D406 and quantization coefficients D407 generated in the course of compression coding to the memory 55. The subsequent operations are similar to those in the image search device 50, and so will not be described any more.

Figure 25:
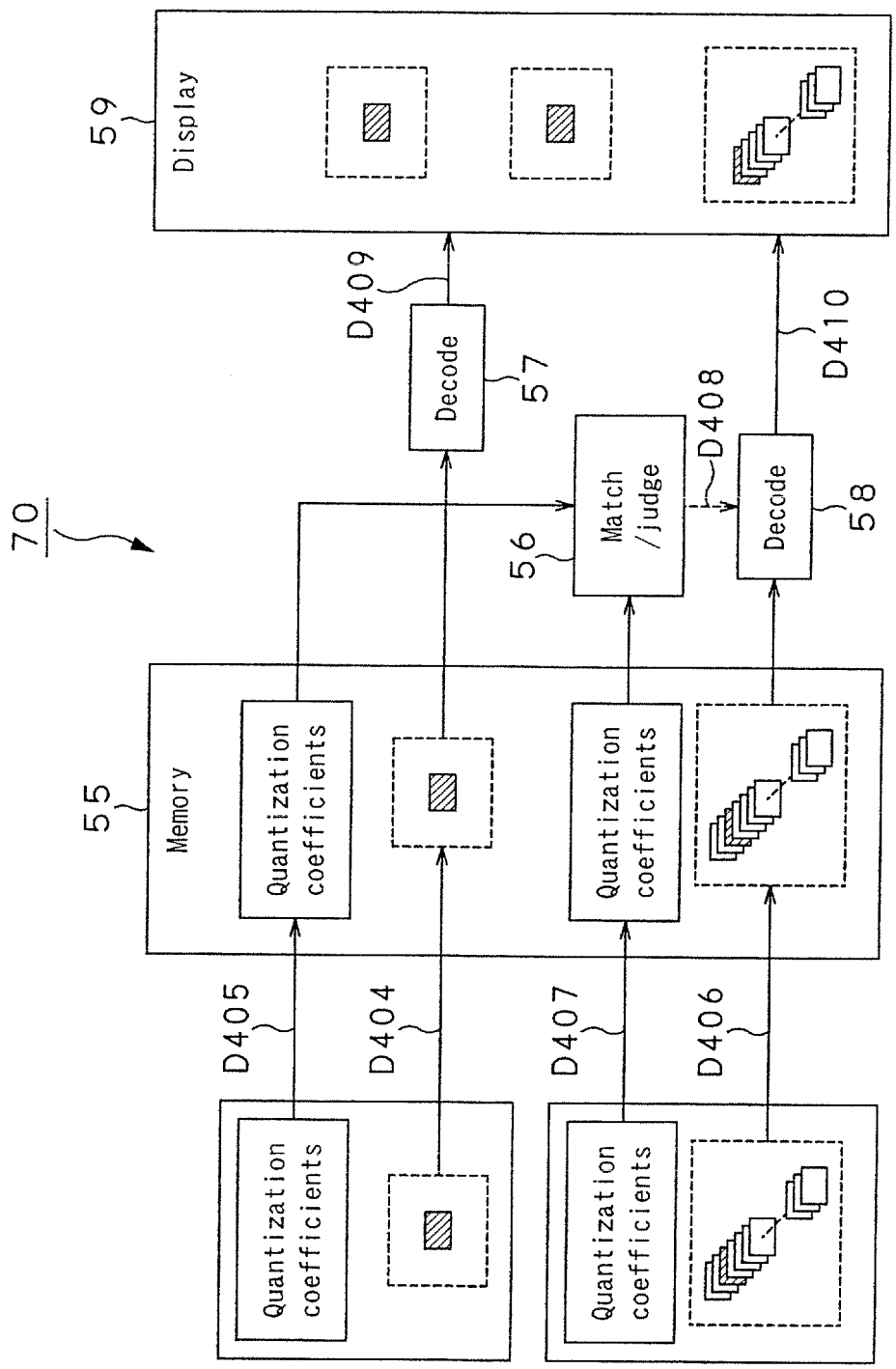
FIG. 25 is a schematic block diagram of the image search device as a variant of the tenth embodiment in which there are already available both an encoded code stream and quantization coefficients of a specific frame and an object encoded code stream and quantization coefficients.

FIG. 25 is a schematic block diagram of the image search device as a variant of the tenth embodiment in which there are already available both an encoded code stream and quantization coefficients of a specific frame and an object encoded code stream and quantization coefficients. The image search device is generally indicated with a reference numeral 70. In this image search device 70, an encoded code stream D404 and quantization coefficients D405 of a specific frame and an object encoded code stream D406 and quantization coefficients D407 are copied or downloaded from a recording medium or external server to the memory 55. The subsequent operations are similar to those in the image search device 50, and so will not be described any more.

Since at least either an encoded code stream and quantization coefficients of a specific frame or an object encoded code stream and quantization coefficients are already available for the image search devices 60 and 70, they can easily be used for matching by copying or downloading them to the memory 55.

Eleventh Embodiment

In the ninth and tenth embodiments, the memory 55 has recorded therein the encoded code stream and quantization coefficients of the specific frame and an object encoded code stream and quantization coefficients. Here will be illustrated and explained an eleventh embodiment in which quantization coefficients of a specific frame and those of an object to be searched are utilized when copying an encoded code stream of the object to be searched from the memory 55 to another recording medium.

Figure 26:
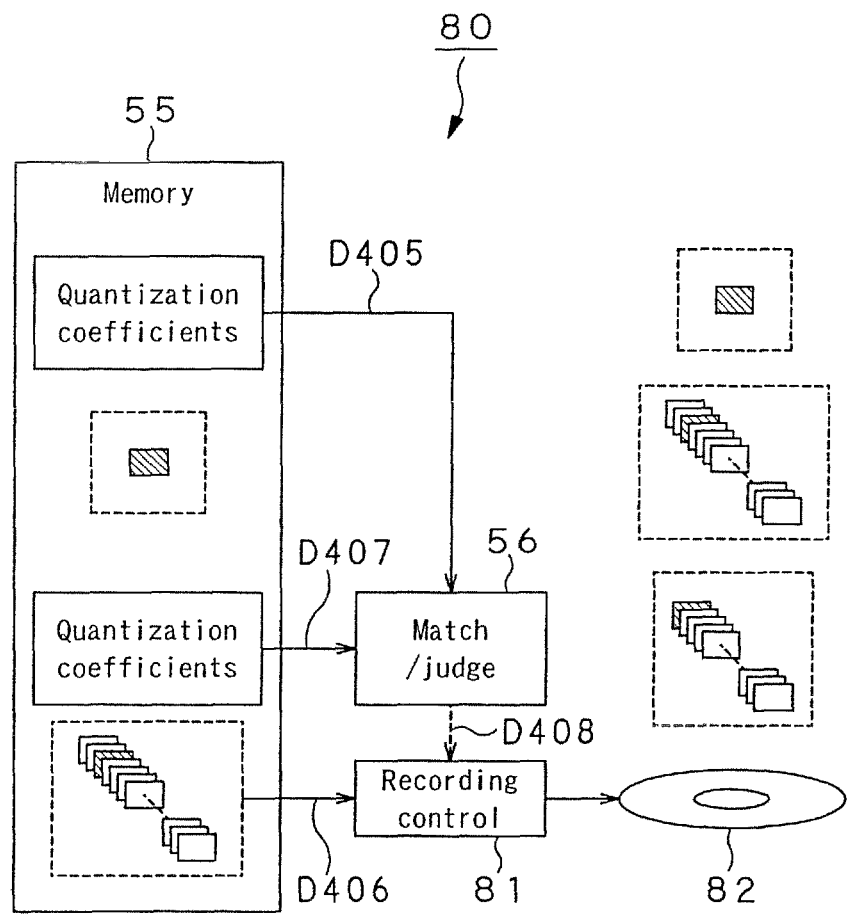
FIG. 26 is a schematic block diagram of an image search device as an eleventh embodiment of the present invention, in which one specific frame is used.

FIG. 26 is a schematic block diagram of an image search device as the eleventh embodiment of the present invention, in which one specific frame is used. The image search device is generally indicated with a reference numeral 80. In this image search device 80, a matching/judging unit 56 makes a comparison between quantization coefficients D405 of a specific frame and those D407 of an object to be searched to search an encoded code stream D406 of the object for a frame generally coincident with the specific frame. In case such a frame generally coincident with the specific frame is found, the matching/judging unit 56 supplies the result of judgment D408 to a recording controller 81 which will control recording of the encoded code stream D406 of the object to a recording medium 82 correspondingly to the result of judgment D408. More specifically, when the encoded code stream D406 is recorded to the recording medium 82, the frame generally coincident with the specific frame is marked as a playback starting frame. Alternatively, a frame generally coincident with the specific frame is taken as a playback starting frame and a frame after the playback starting frame is recorded to the recording medium 82. It should be noted that the image search device 80 may be adapted such that the encoded code stream of the specific frame is separately recorded to the recording medium 82.

Figure 27:
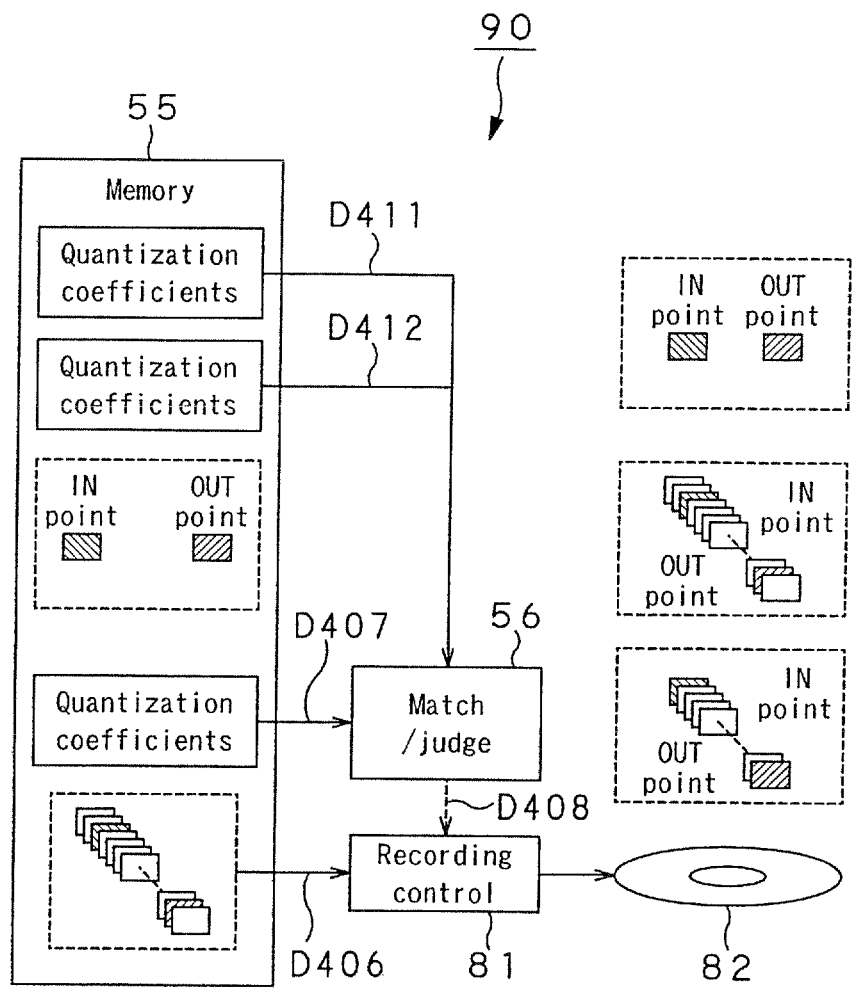
FIG. 27 is a schematic block diagram of the image search device as a variant of the eleventh embodiment, in which two specific frames are used.

FIG. 27 is a schematic block diagram of the image search device as a variant of the eleventh embodiment, in which two specific frames are used. This image search device is generally indicated with a reference numeral 90. In this image search device 90, the matching/judging unit 56 makes a comparison between quantization coefficients D411 of a first specific frame and those D407 of an object to be searched to search an object encoded code stream D406 for a frame generally coincident with the first specific frame. Similarly, the matching/judging unit 56 makes a comparison between quantization coefficients D412 of a second specific frame and those D407 of an object to be searched to search the object encoded code stream D406 for a frame generally coincident with the second specific frame. In case such frames generally coincident with the first and second frames, respectively, are found, the matching/judging unit 56 supplies the result of judgment D408 to the recording controller 81 which will control recording of the encoded code stream D406 of the object to the recording medium 82 correspondingly to the result of judgment D408. More specifically, when the encoded code stream D406 is recorded to the recording medium 82, the frames generally coincident with the first and second specific frames are marked as a playback starting frames (IN point) and a playback ending frame (OUT point), respectively. Alternatively, frames generally coincident with the first and second specific frames are taken as playback starting and ending frames, respectively, and frames including frames from the playback starting frame to playback ending frame are recorded to the recording medium 82. It should be noted that the image search device 90 may be adapted such that the encoded code streams of the first and second specific frames are separately recorded to the recording medium 82. Also, the image search device 90 may only be adapted such that the encoded code stream D406 is recorded to the recording medium 82 and the frames generally coincident with the first and second specific frames are marked as playback starting and ending frames, respectively.

Further, in case n specific frames are used, frames generally coincident with the first and n-th specific frames may be marked as a playback starting frame (IN point) and playback ending frame (OUT point), respectively, while frames generally coincident with the second, . . . , (n−1)-th specific frames may be marked as playback resuming points (scene change point, chapter point, etc. for example).

In the foregoing, the present invention has been illustrated and explained concerning the preferred embodiments thereof but is not limited to the embodiments.

For example, although the aforementioned embodiments have been described with a still picture being taken as a search query, a moving picture may be taken as the search query. In this case, image search can be done as above with part of a plurality of frames forming a moving picture as the search query being selected as a search query for a still picture and names coincident with the search query, counting a larger number than a predetermined one (threshold), can be searched as the same moving pictures.

Also, the series of operations made in the aforementioned embodiments may be performed by a software. In this case, a program forming the software may be pre-incorporated in a dedicated hardware, for example, ROM or hard disk, of a computer. Alternatively, it may be installed, via a network or a program recording medium, in a genera-purpose personal computer having various programs being installed therein and which can thus perform a variety of functions.

The program recording medium and aforementioned recording medium may be a package medium such as a magnetic disk (including a flexible disk), optical disk (CD-ROM (=compact disk-read-only memory) and DVD (digital versatile disk)), magneto-optical disk (MD (=Mini-Disk (trade mark)) or semiconductor memory.

It should be understood by those skilled in the art that various modifications, combinations, sub-combinations and alterations may occur depending on design requirements and other coefficients insofar as they are within the scope the appended claims or the equivalents thereof.

What is claimed is:

1. An image search device that searches an object encoded code stream formed by compression coding of a plurality of frames for a frame generally coincident with a specific one, the device comprising: a decoding means for making entropy decoding of the object encoded code stream to generate quantization coefficients of each frame;
   a matching means for making matching between the quantization coefficients of the specific frame and those of each frame which are generated by the decoding means and correspond in sample position to those of the specific frame; and
   a judging means for judging, based on the result of matching, whether the frame is generally coincident with the specific one, wherein the judging means increases the count of a counter each time there arises a frame whose quantization coefficients do not match in sign with those of the specific frame, and decides that the frame is generally coincident with the specific one in case the count when the matching of all the quantization coefficients of the frame with those of the specific frame is over is smaller than a predetermined threshold.

2. The device according to claim 1, further comprising displaying means for displaying the image of the specific frame and that of a frame decided by the judging means to be generally coincident with the specific one, respectively.

3. The device according to claim 2, wherein in case there is not any frame decided by the judging means to be generally coincident with the specific frame, the display means display the image of the specific frame and that of a frame for which the count of the counter is minimum, respectively.

4. The device according to claim 1, wherein the decoding, means decodes the object encoded code stream by EBCOT decoding defined in JPEG 2000 to generate quantization coefficients of each frame whose wavelet transform coefficients have been scalar-quantized.

5. The device according to claim 4, wherein the matching means makes matching between quantization coefficients at each code block in a plurality of sub bands formed by band dividing.

6. The device according to claim 5, wherein the matching means makes matching between quantization coefficients in an order from the sub band in the lowest band toward the sub band in the highest hand.

7. The device according to claim 5, wherein the matching means makes matching between only quantization coefficients of the sub bands through a specific sub band or specific, code block.

8. The device according to claim 5, wherein after completion of matching on all quantization coefficients in a code block, the decoding means generates quantization coefficients of a next code block.

9. An image search device that searches an object encoded code stream formed by compression coding of a plurality of frames for a frame generally coincident with a specific one, the device comprising:
   a quantization or transform coefficient acquiring means for acquiring quantization or transform coefficients of each frame, calculated when generating the object encoded code stream, and quantization or transform coefficients of the specific frame;
   a matching means for making matching between the quantization or transform coefficients of the specific frame and those of each frame which are generated by the quantization or transform coefficient acquiring means and correspond in sample position to those of the specific frame; and
   a judging means for judging, based on the result of matching, whether each frame is generally coincident with the specific one, wherein the judging means increases the count of a counter each time there arises a frame whose quantization coefficients do not match in sign with those of the specific frame, and decides that the frame is generally coincident with the specific one in case the count when the matching of all the quantization coefficients of the frame with those of the specific frame is over is smaller than a predetermined threshold.

10. The device according to claim 9, wherein the quantization or transform coefficients of each frame, calculated when generating the object encoded code stream and those of the specific frame are recorded in a recording medium.

11. The device according to claim 9, further comprising:
    a decoding means for decoding a frame decided by the judging means to be generally coincident with the specific frame; and
    an outputting means for outputting the image of the frame decoded by the decoding means to displaying means.

12. The device according to claim 9, further comprising:
    a decoding means for decoding the object encoded code stream; and
    an outputting means for outputting the object encoded code stream, decoded by the decoding means, to displaying means with a frame decided by the judging means to be generally coincident with the specific frame being taken as a playback starting or ending frame.

13. The device according to claim 9, further comprising a recording control means for recording the object encoded code stream to a recording medium with a frame decided by the judging means to be generally coincident with the specific frame being taken as a playback starting or ending frame.

14. An image searching method of searching an object encoded code stream formed by compression coding of a plurality of frames for a frame generally coincident with a specific one, the method comprising the steps of:
    acquiring quantization or transform coefficients of each frame, calculated when generating the object encoded code stream, and quantization or transform coefficients of the specific frame;
    making matching between the quantization or transform coefficients of the specific frame and those of each frame which are generated in the quantization or transform coefficient acquiring step and correspond in sample position to those of the specific frame; and
    judging, based on the result of matching, whether each frame is generally coincident with the specific one, wherein the judging increases the count of a counter each time there arises a frame whose quantization coefficients do not match in sign with those of the specific frame, and decides that the frame is generally coincident with the specific one in case the count when the matching of all the quantization coefficients of the frame with those of the specific frame is over is smaller than a predetermined threshold.

15. A program stored in a non-transitory tangible medium for allowing a computer to search an object encoded code stream formed by compression coding of a plurality of frames for a frame generally coincident with a specific one, the program comprising the steps of:

acquiring quantization or transform coefficients of each frame, calculated when generating, the object encoded code stream, and quantization or transform coefficients of the specific frame;

making matching between the quantization or transform coefficients of the specific frame and those of each frame which are generated in the quantization or transform coefficient acquiring step and correspond in sample position to those of the specific frame; and judging, based on the result of matching, whether each frame is generally coincident with the specific one, wherein the judging increases the count of a counter each time there arises a frame whose quantization coefficients do not match in sign with those of the specific frame, and decides that the frame is generally coincident with the specific one in case the count when the matching of all the quantization coefficients of the frame with those of the specific frame is over is smaller than a predetermined threshold.

16. A non-transitory tangible program recording medium readable by a computer and having recorded therein a program allowing the computer to search an object encoded code stream formed by compression coding of a plurality of frames for a frame generally coincident with a specific one, the program comprising the steps of:

acquiring quantization or transform coefficients of each frame, calculated when generating the object encoded code stream, and quantization or transform coefficients of the specific frame;

making matching between the quantization or transform coefficients of the specific frame and those of each frame which are generated in the quantization or transform coefficient acquiring step and correspond in sample position to those of the specific frame; and judging, based on the result of matching, whether each frame is generally coincident with the specific one, wherein the judging increases the count of a counter each time there arises a frame whose quantization coefficients do not match in sign with those of the specific frame, and decides that the frame is generally coincident with the specific one in case the count when the matching of all the quantization coefficients of the frame with those of the specific frame is over is smaller than a predetermined threshold.

* * * * *